US010433200B2

United States Patent
Lee et al.

(10) Patent No.: US 10,433,200 B2
(45) Date of Patent: Oct. 1, 2019

(54) METHOD FOR TERMINAL FOR REPORTING CHANNEL STATUS INFORMATION IN WIRELESS COMMUNICATION SYSTEM SUPPORTING CARRIER AGGREGATION, AND APPARATUS FOR THE METHOD

(71) Applicant: LG ELECTRONICS INC., Seoul (KR)

(72) Inventors: Hyunho Lee, Seoul (KR); Suckchel Yang, Seoul (KR); Seungmin Lee, Seoul (KR); Yunjung Yi, Seoul (KR); Hanjun Park, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/532,991

(22) PCT Filed: Dec. 9, 2015

(86) PCT No.: PCT/KR2015/013462
§ 371 (c)(1),
(2) Date: Jun. 2, 2017

(87) PCT Pub. No.: WO2016/093621
PCT Pub. Date: Jun. 16, 2016

(65) Prior Publication Data
US 2017/0359746 A1    Dec. 14, 2017

Related U.S. Application Data

(60) Provisional application No. 62/089,258, filed on Dec. 9, 2014, provisional application No. 62/096,543, filed on
(Continued)

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0613* (2013.01); *H04B 7/0626* (2013.01); *H04L 5/00* (2013.01); *H04W 72/1289* (2013.01)

(58) Field of Classification Search
None
See application file for complete search history.

(56) References Cited

U.S. PATENT DOCUMENTS

2012/0076017 A1* 3/2012 Luo .................. H04L 1/0026
370/252
2012/0307757 A1* 12/2012 Edler Von Elbwart ................
H04L 1/0026
370/329
(Continued)

FOREIGN PATENT DOCUMENTS

WO      2012141421      10/2012
WO      2014112937      7/2014

OTHER PUBLICATIONS

PCT International Application No. PCT/KR2015/013462, Written Opinion of the International Searching Authority dated Mar. 30, 2016, 22 pages.
(Continued)

Primary Examiner — James P Duffy
(74) Attorney, Agent, or Firm — Lee, Hong, Degerman, Kang & Waimey

(57) ABSTRACT

A method for a user equipment for reporting aperiodic channel status information in a carrier aggregation system according to one embodiment of the present invention is carried out by the user equipment and may comprise the steps of: receiving downlink control information, comprising a CSI request field, for approving an uplink from a base station; selecting one triggering set from among a plurality of triggering sets corresponding to the particular bit value of the CSI request field; and transmitting, to the base station, CSI for at least one CC or CSI process included in the selected triggering set.

19 Claims, 8 Drawing Sheets

Related U.S. Application Data on Dec. 24, 2014, provisional application No. 62/109,638, filed on Jan. 30, 2015, provisional application No. 62/144,979, filed on Apr. 9, 2015.

(51) Int. Cl.
  *H04W 72/12* (2009.01)
  *H04L 5/00* (2006.01)

(56) References Cited

U.S. PATENT DOCUMENTS

| | | | |
|---|---|---|---|
| 2013/0039197 A1* | 2/2013 | Pan | H04L 1/0026 370/252 |
| 2013/0051349 A1* | 2/2013 | Lv | H04L 1/0026 370/329 |
| 2013/0077596 A1* | 3/2013 | Liang | H04L 1/0031 370/329 |
| 2013/0121301 A1 | 5/2013 | Kim et al. | |
| 2013/0286970 A1* | 10/2013 | Wang | H04W 72/04 370/329 |
| 2014/0086174 A1 | 3/2014 | Nam et al. | |

OTHER PUBLICATIONS

Samsung, "Aperiodic CSI Triggering for CoMP", 3GPP TSG RAN WG1 Meeting #70, R1-123470, Aug. 2012, 3 pages.

\* cited by examiner

FIG. 5
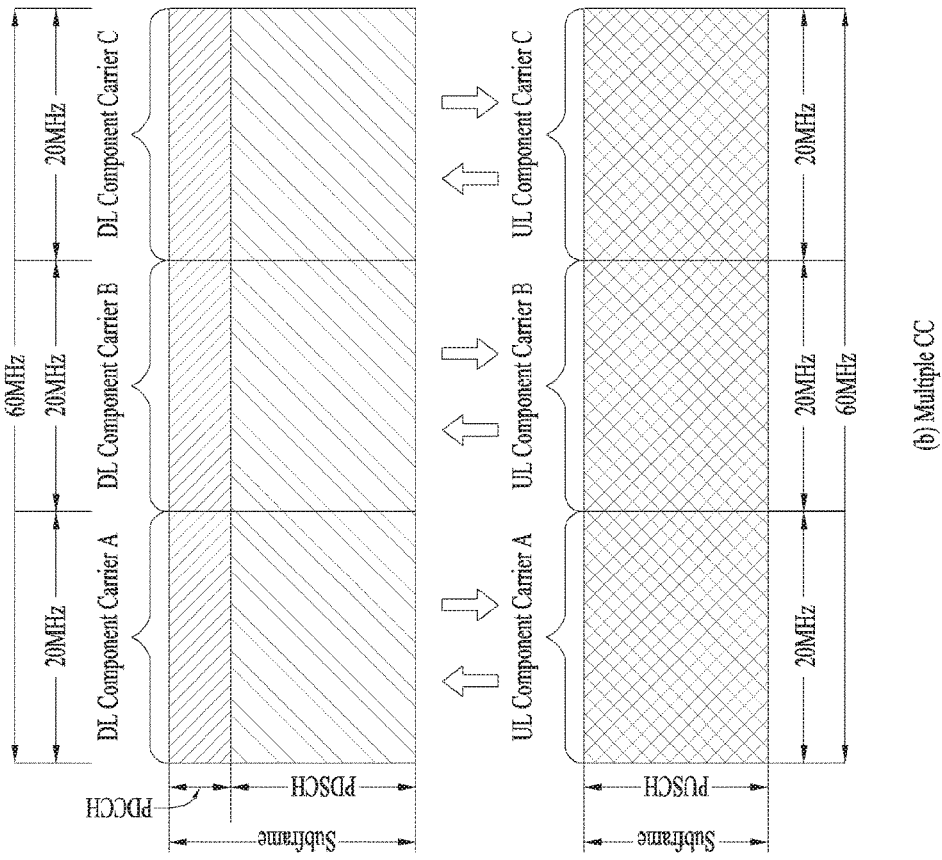
(b) Multiple CC
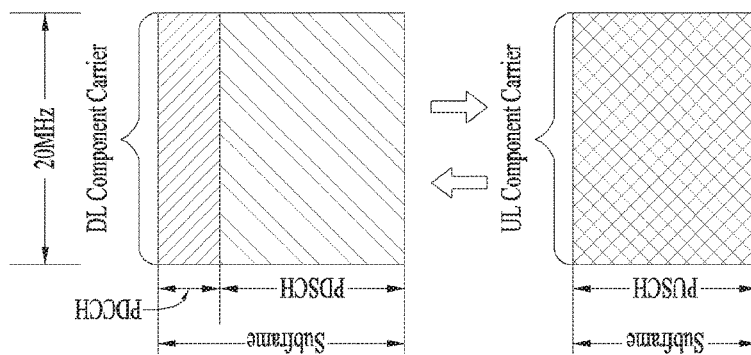
(a) Single CC

METHOD FOR TERMINAL FOR REPORTING CHANNEL STATUS INFORMATION IN WIRELESS COMMUNICATION SYSTEM SUPPORTING CARRIER AGGREGATION, AND APPARATUS FOR THE METHOD

CROSS-REFERENCE TO RELATED APPLICATIONS

This application is the National Stage filing under 35 U.S.C. 371 of International Application No. PCT/KR2015/013462, filed on Dec. 9, 2015, which claims the benefit of U.S. Provisional Application No. 62/089,258, filed on Dec. 9, 2014, 62/096,543, filed on Dec. 24, 2014, 62/109,638, filed on Jan. 30, 2015 and 62/144,979, filed on Apr. 9, 2015, the contents of which are all hereby incorporated by reference herein in their entirety.

TECHNICAL FIELD

The present invention relates to a wireless communication system, and more particularly, to a method for reporting channel status information through a user equipment in a wireless communication system supporting carrier aggregation and an apparatus for the method.

BACKGROUND ART

In a wireless cellular communication system, one base station controls data transmission and reception for a plurality of user equipments (UEs), and scheduling information on downlink data, for example, time/frequency information for data transmission and MCS (modulation and coding scheme) and HARQ (hybrid automatic retransmission request) related information are transmitted to a corresponding UE to allow the UE to receive data. Similarly, the base station notifies the corresponding UE of uplink scheduling information to allow the UE to transmit uplink data. Recently, CA (carrier aggregation) for transmitting downlink data to a single UE by aggregating unit component carrier (CC) has been considered to support a wider bandwidth while using band identification of the related art. Particularly, in the LTE standard, self-carrier scheduling and cross-carrier scheduling have been considered. In the self-carrier scheduling, each of a plurality of CCs transmits a control channel having scheduling information in a state that a plurality of CCs of different duplex modes or the same duplex mode are aggregated. In the cross-carrier scheduling, one of the plurality of CCs transmits a control channel having scheduling information of another CC. In the current LTE standard, CA for transmitting downlink data by aggregating 5 CCs has been considered. However, CA enhancement for transmitting downlink data by aggregating 5 or more CCs, for example, 8 or 16 CCs is recently considered to support traffic load which is rapidly increased.

DISCLOSURE

Technical Problem

Based on the aforementioned discussion, an object of the present invention is to provide a method for effectively reporting channel status information in a wireless communication system through a UE supporting carrier aggregation.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A method for enabling a UE to report aperiodic channel status information (CSI) in a carrier aggregation system according to one embodiment of the present invention is carried out by the UE and may comprise the steps of receiving downlink control information (DCI) for uplink grant including a CSI request field, from a base station; selecting one of a plurality of triggering sets corresponding to a specific bit value of the CSI request field; and transmitting, to the base station, CSI for at least one component carrier (CC) or CSI process included in the selected triggering set.

Additionally or alternatively, the selected triggering set may be selected based on any one of an uplink CC scheduled by the DCI, a downlink CC to which the DCI is transmitted, a downlink subframe to which the DCI is transmitted, and an uplink subframe to which the CSI is transmitted.

Additionally or alternatively, the selected triggering set may be selected based on any one of the number of resource blocks allocated by the DCI, a range of the resource blocks, and a start index of the resource blocks.

Additionally or alternatively, the selected triggering set may be selected based on a cyclic shift field value included in the DCI.

Additionally or alternatively, the selected triggering set may be selected based on a format of the DCI.

Additionally or alternatively, the DCI may be DCI for requesting physical uplink shared channel (PUSCH) transmission having no uplink shared channel (UL-SCH), and the selected triggering set may be selected based on a value of a modulation and coding scheme (MCS) field included in the DCI.

Additionally or alternatively, the CSI may be transmitted through an uplink CC designated through a higher layer signal among a plurality of uplink CCs scheduled through multi-CC scheduling.

Additionally or alternatively, the CSI may be transmitted through an uplink CC designated by the DCI or an uplink CC corresponding to a downlink CC to which the DCI is transmitted, among a plurality of uplink CCs scheduled through multi-CC scheduling.

Additionally or alternatively, the selected triggering set may be selected based on a search space into which CC of the DCI is mapped, or a resource to which the CCE is transmitted.

Additionally or alternatively, a specific triggering set corresponding to a case that the specific bit value is "01" may include a plurality of CCs or a plurality of CSI processes for the plurality of CCs, and the method may comprise the step of generating CSI for only some of the plurality of CCs or CSI processes when the received CSI request field is 1 bit and is set to a bit value of "1" and the DCI is mapped into a common search space (CSS).

Additionally or alternatively, the CSI may be generated for only CCs or CSI processes belonging to a licensed band among the plurality of CCs or CSI processes when the received CSI request field is 1 bit and is set to a bit value of "1" and the DCI is mapped into the CSS.

Additionally or alternatively, at least two triggering sets corresponding to the bit value of the CSI request field may include a first triggering set and a second triggering set that includes only some of the plurality of CCs or CSI processes included in the first triggering set.

Additionally or alternatively, the first triggering set may include at least one licensed band CC and at least one unlicensed band CC, and the second triggering set includes the at least one licensed band CC only.

Additionally or alternatively, the at least one CC or CSI process may be selected by circular shift selection from all CCs or CSI processes included in the selected triggering set when a CSI request for the selected triggering set is repeated.

A UE configured to report aperiodic channel status information (CSI) in a carrier aggregation system according to another embodiment of the present invention comprises a radio frequency (RF) unit; and a processor configured to control the RF unit, wherein the processor may be configured to receive downlink control information (DCI) for uplink grant including a CSI request field, from a base station, select one of a plurality of triggering sets corresponding to a specific bit value of the CSI request field, and transmit, to the base station, CSI for at least one component carrier (CC) or CSI process included in the selected triggering set.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, a UE may efficiently report channel status information in a wireless communication system supporting carrier aggregation.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating single carrier communication and multicarrier communication;

BEST MODE FOR CARRYING OUT THE INVENTION

Figure 1:
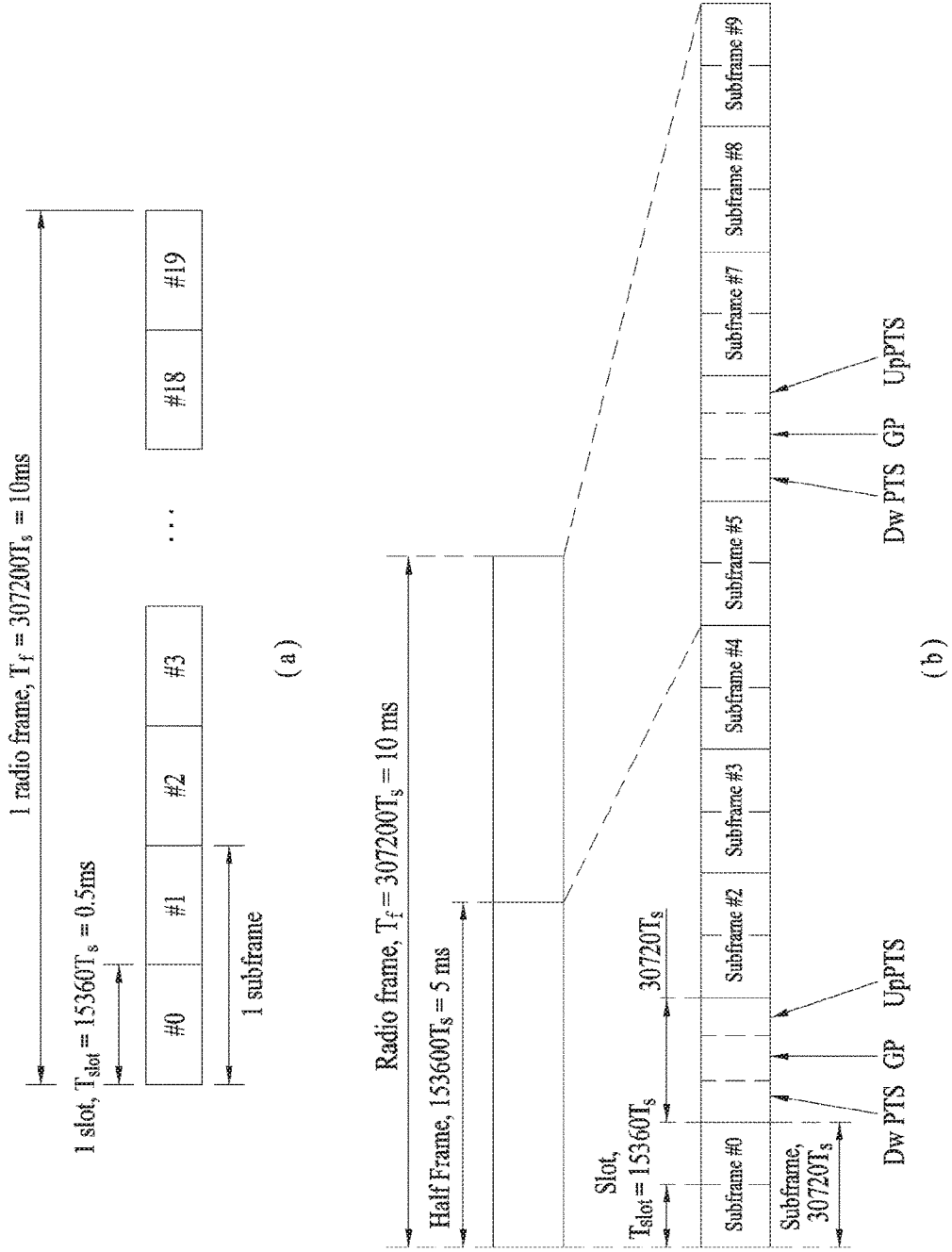
FIG. 1 is diagram illustrating an example of a radio frame structure used in a wireless communication system.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE) (that is, GERAN). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunication system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/ LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmission device determines whether another transmission is being performed before attempting to transmit traffic to a reception device. In other words, the transmission device attempts to detect the presence of a carrier from another transmission device before attempting to perform transmission. Upon sensing the carrier, the transmission device waits for another transmission device which is performing transmission to finish transmission, before initiating transmission thereof. Consequently, CSMA can be a communication scheme based on the principle of "sense before transmit" or "listen before talk". A scheme for avoiding collision between transmission devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission, and CSMA/CD is a scheme for flexibly transmitting data by monitoring collision. A transmission device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the LTE/LTE-A based system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will later be described in detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH resource, respectively. Hereinafter, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe, and a subframe in which a synchronization signal (e.g., PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the terms CRS/UE-RS/CSI-RS/TRS ports may also be used to indicate a pattern of REs occupied by CRSs/UE-RSs/CSI-RSs/TRSs in a predetermined resource region.

FIG. 1 illustrates an example of a radio frame structure used in a wireless communication system.

Specifically, FIG. 1(a) illustrates an exemplary structure of a radio frame for frequency division multiplexing (FDD) used in a 3GPP LTE/LTE-A system, and FIG. 1(b) illustrates an exemplary structure of a radio frame for time division multiplexing (TDD) used in a 3GPP LTE/LTE-A system.

Referring to FIG. 1, the radio framed used in a 3GPP LTE/LTE-A system is 10 ms ($307200T_s$) in duration. The radio frame is divided into 10 subframes (SFs) of equal size. Subframe numbers may be assigned to the 10 subframes within one radio frame, respectively. In this case, $T_s$ denotes sampling time and is represented by $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may be configured differently depending on duplex modes. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Table 1 shows an exemplary UL-DL configuration of subframes within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). The DwPTS is a time slot reserved for DL transmission and the UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS ee | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
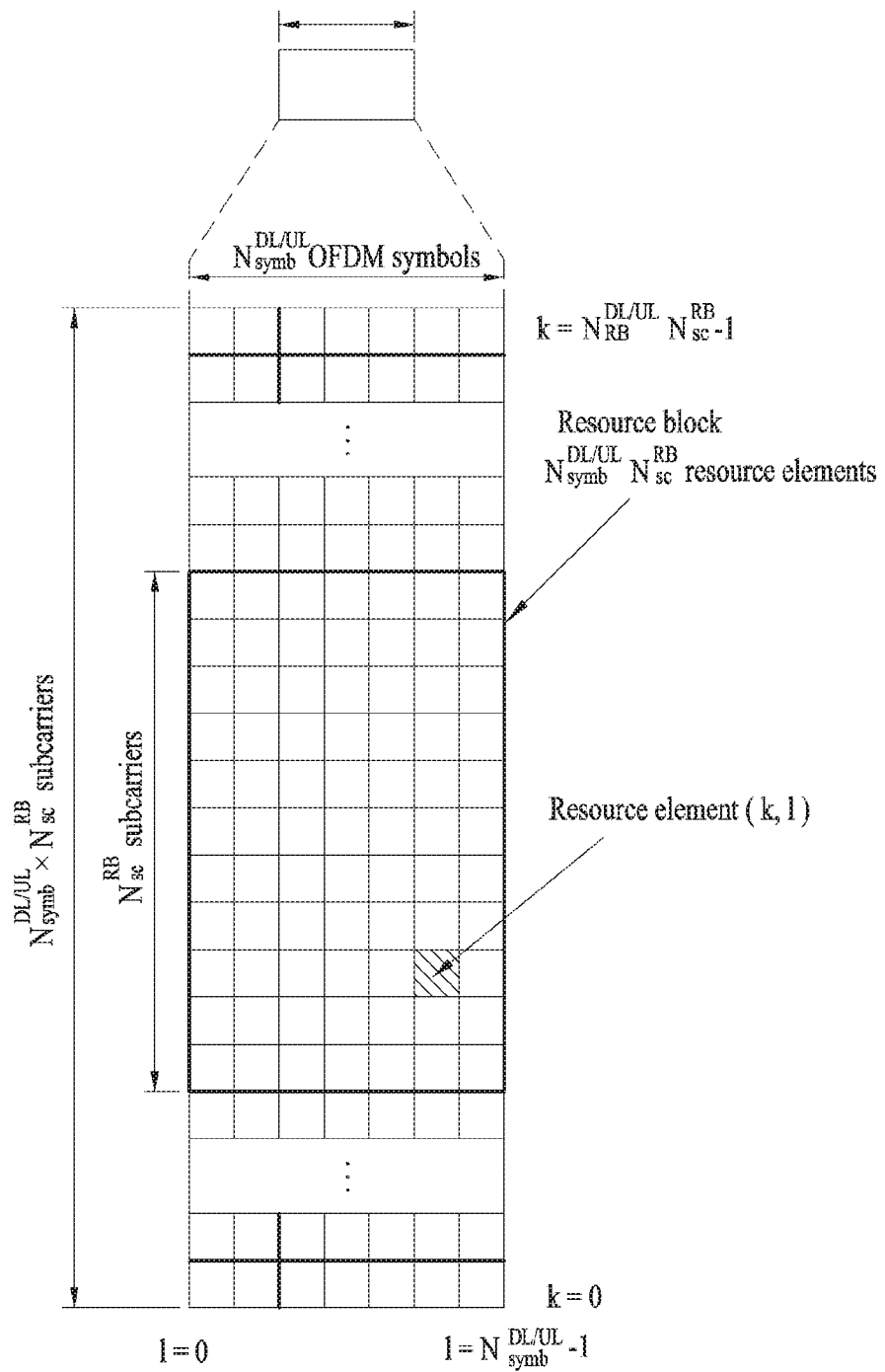
FIG. 2 is diagram illustrating an example of a downlink/uplink (DL/UL) slot structure in a wireless communication system.

FIG. 2 is a diagram illustrating a resource grid of a DL slot.

Although FIG. 2 illustrates that one DL slot includes 7 OFDM symbols in a time domain and one resource block (RB) includes 12 subcarriers in a frequency domain, the present invention is not limited to the example of FIG. 2. For example, in case of normal cyclic prefix (CP), one slot includes 7 OFDM symbols, however, in case of extended CP, one slot may include 6 OFDM symbols. One resource block (RB) includes 12×7 resource elements (REs). The number NDL of RBs included in the downlink slot depends on a downlink transmit bandwidth. The structure of a UL slot may be the same as that of the DL slot.

Figure 3:
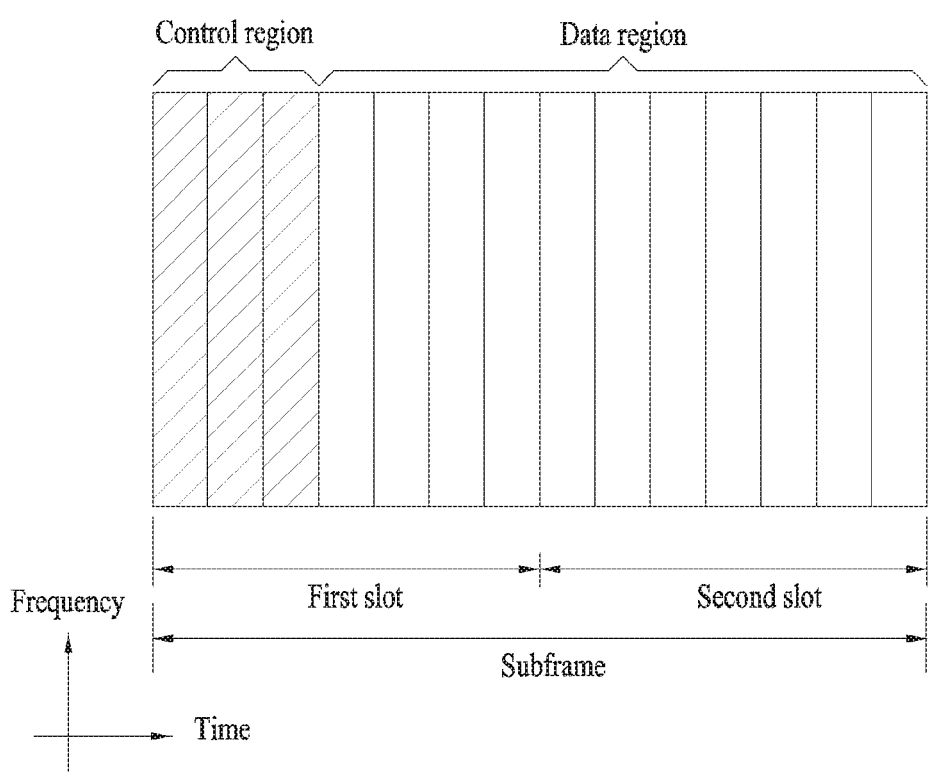
FIG. 3 is diagram illustrating an example of a downlink (DL) subframe structure used in a wireless communication system.

FIG. 3 illustrates a structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe correspond to the control region to which a control channel is allocated. Hereinafter, a resource region available for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols used for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) is referred to as DL scheduling information or DL grant. Transmit format and resource allocation information of an uplink shared channel (UL-SCH) is referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), and precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A DCI format and the number of DCI bits are determined depending on the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

If RRH technology, cross-carrier scheduling technology, etc. are introduced, the amount of PDCCH which should be transmitted by the eNB is gradually increased. However, since a size of a control region to which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH). The EPDCCH may be configured for rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that(those) configured for transmission of a CRS, and a UE configured to decode the PDCCH may demodulate or decode the PDCCH by using the CRS. Unlike the PDCCH transmitted based on the CRS, the EPDCCH may be transmitted based on the demodulation RS (hereinafter, DMRS). Accordingly, the UE may decode/demodulate the PDCCH based on the CRS and decode/demodulate the EPDCCH based on the DMRS. The DMRS associated with the EPDCCH is transmitted on the same antenna port $p \in \{107,108,109,110\}$ as the EPDCCH physical resource, is present for EPDCCH demodulation only if the EPDCCH is associated with the corresponding antenna port, and is transmitted only on the PRB(s) to which the EPDCCH is mapped.

Even in case of the DMRS for demodulation of the EPDCCH in the same manner as the UE-RS for demodulation of the PDSCH, if the type of the EPDCCH and the number of layers are equally applied to the DMRS, a certain number of REs per RB pair are used for DMRS transmission regardless of the UE or cell. Hereinafter, except for a case specific to the EPDCCH, the PDCCH and the EPDCCH will be referred to as PDCCH. The present invention may be applied to EPDCCH, PUSCH, and PDSCH and/or PUSCH scheduled by the EPDCCH as well as PDCCH, PUCCH, and PDSCH and/or PUSCH scheduled by the PDCCH.

In the 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined in terms of SSs. The SSs may have different sizes, and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). In this case, monitoring means attempting to decode each PDCCH in the corresponding SS in accordance with all monitored DCI formats. The UE may detect its PDCCH by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected. This process is referred to as blind detection (or blind decoding (BD)).

For example, it is assumed that a specific PDCCH is CRC-masked with a radio network temporary identity (RNTI) 'A' and information about data transmitted using a radio resource 'B' (e.g., frequency location) and using transport format information 'C' (e.g., transport block size, modulation scheme, coding information, etc.) is transmitted through a specific DL subframe. Then, the UE monitors the PDCCH using RNTI information thereof. The UE having the RNTI 'A' detects the PDCCH and receives the PDSCH indicated by 'B' and 'C' through information of the received PDCCH.

Generally, a DCI format which may be transmitted to the UE is varied depending on a transmission mode (TM) configured for the UE. In other words, for the UE configured for a specific transmission mode, not all DCI formats but some DCI format(s) corresponding to the specific transmission mode can be used. For example, the UE is semi-statically configured by higher layers so as to receive PDSCH data transmission, which is signaled through the PDCCH, in accordance with one of a plurality of transmission modes previously defined. To maintain operation load of the UE according to blind decoding attempt at a predetermined level or less, not all DCI formats are always simultaneously searched by the UE.

Figure 4:
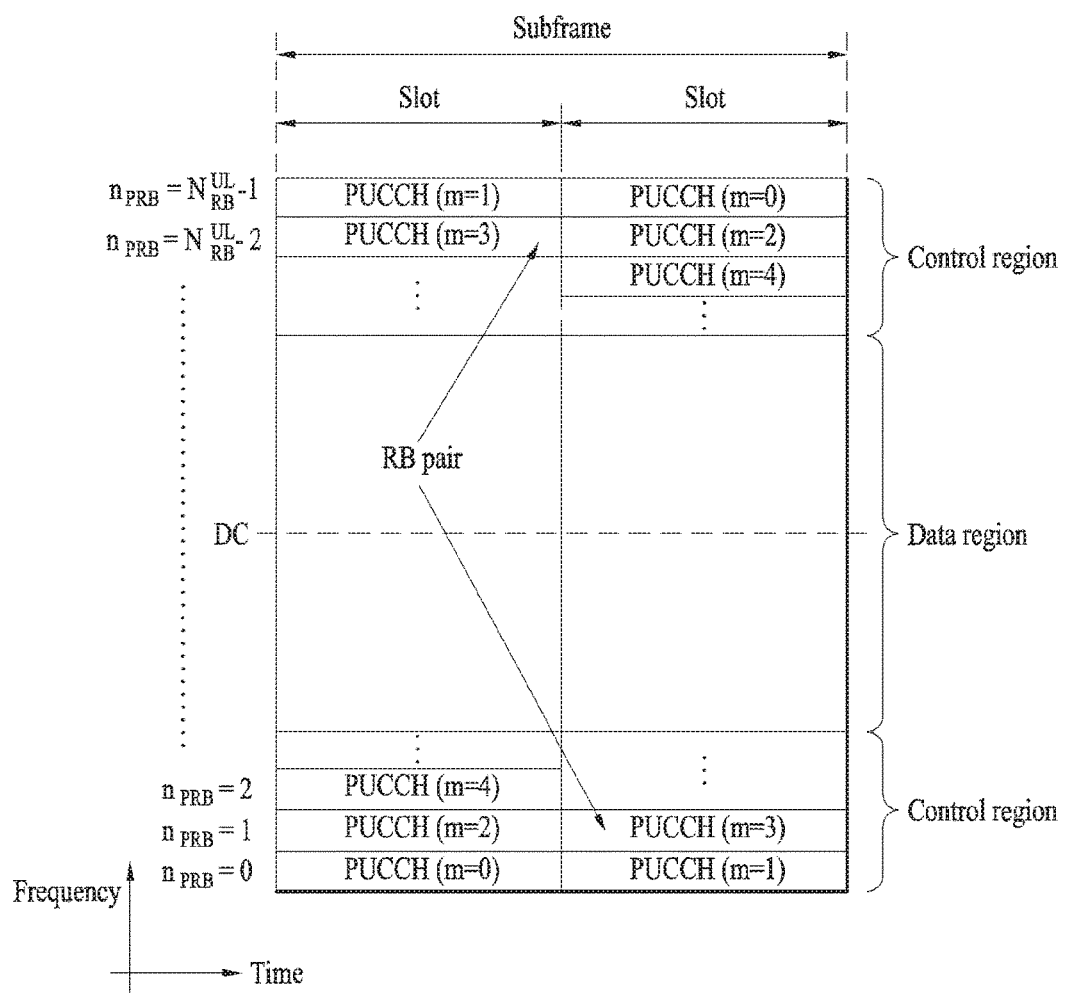
FIG. 4 is diagram illustrating an example of an uplink (UL) subframe structure used in a wireless communication system.

FIG. 4 illustrates an example of a structure of a UL subframe used in a wireless communication system.

Referring to FIG. 4, a UL subframe may be divided into a control region and a data region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission bandwidth are allocated to transmit UCI. A DC subcarrier is a component unused for signal transmission and is mapped to a carrier frequency f0 in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g., codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

FIG. 5 is a diagram illustrating single carrier communication and multicarrier communication. Particularly, FIG. 5(a) illustrates a subframe structure of a single carrier, and FIG. 5(b) illustrates a subframe structure of multiple carriers.

Referring to FIG. 5(a), a general wireless communication system performs data transmission or reception through one downlink (DL) band and through one uplink (UL) band corresponding to the DL band (in case of a frequency division duplex (FDD) mode), or divides a predetermined radio frame into a UL time unit and a DL time unit in the time domain and then performs data transmission or reception through the UL/DL time unit (in case of a time division duplex (TDD) mode). Recently, to use a wider frequency band in wireless communication systems, the introduction of carrier aggregation (or bandwidth aggregation) technology that uses a wider UL/DL bandwidth by aggregating a plurality of UL and/or DL frequency blocks has been discussed. Carrier aggregation (CA) is different from an orthogonal frequency division multiplexing (OFDM) system in that DL or UL communication is performed using a plurality of carrier frequencies, whereas the OFDM system carries a basic frequency band divided into a plurality of orthogonal subcarriers on a single carrier frequency to perform DL or UL communication. Hereinafter, each of carriers aggregated by carrier aggregation will be referred to as a component carrier (CC). Referring to FIG. 5(b), three 20 MHz CCs may be aggregated on each of a UL and a DL to support a bandwidth of 60 MHz. The respective CCs may be contiguous or non-contiguous in the frequency domain. For convenience, although FIG. 5(b) illustrates that the bandwidth of UL CC and the bandwidth of DL CC are the same as each other and symmetric to each other, the bandwidth of each CC may be determined independently. Asymmetric carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of DL resources and UL resources, that is, combination of DL CC and UL CC. The cell may be configured by DL resources only, or may be configured by combination of DL resources and UL resources. If carrier aggregation is supported, linkage between a carrier frequency of the DL resources (or DL CC) and a carrier frequency of the UL resources (or UL CC) may be indicated by system information. For example, combination of the DL resources and the UL resources may be indicated by linkage of system information block type 2 (SIB2). In this case, the carrier frequency means a center frequency of each cell or CC. Hereinafter, a cell operating on a primary frequency will be referred to as a primary cell (Pcell) or PCC, and a cell operating on a secondary frequency will be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). The Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the S cell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

Figure 6:
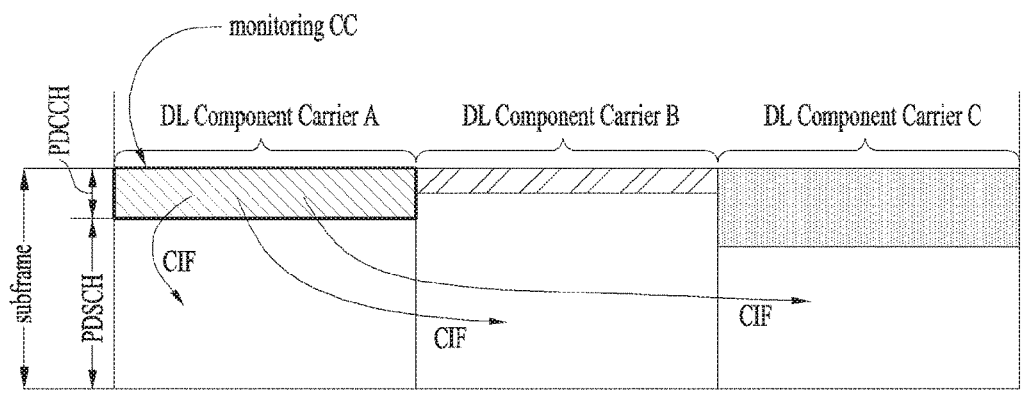
FIG. 6 is a diagram illustrating cross-carrier scheduling.

FIG. 6 is a diagram illustrating cross-carrier scheduling.

Cross-carrier scheduling means that a control region of any one DL CC of a plurality of serving cells includes downlink scheduling allocation information of the other DL CCs or a control region of any one DL CC of a plurality of serving cells includes uplink scheduling grant information on a plurality of UL CCs linked with the corresponding DL CC.

With respect to cross-carrier scheduling, a carrier indicator field (CIF) will be described. The CIF may be included in a DCI format transmitted through a PDCCH (for example, the CIF is defined at a 3-bit size) or not (for example, the CIF is defined at a 0-bit size). When the CIF is included in the DCI format, this represents that cross-carrier scheduling is applied. When cross-carrier scheduling is not applied, downlink scheduling allocation information is valid on a DL CC currently carrying the downlink scheduling allocation information. Also, uplink scheduling grant is valid on a UL CC linked with a DL CC carrying downlink scheduling allocation information.

When cross-carrier scheduling is applied, the CIF indicates a CC associated with downlink scheduling allocation information transmitted on a DL CC through a PDCCH. For example, referring to FIG. 11, downlink allocation information for DL CC B and DL CC C, that is, information about PDSCH resources is transmitted through a PDCCH in a control region on DL CC A. A UE can recognize PDSCH resource regions and the corresponding CCs through the CIF by monitoring DL CC A.

Whether or not the CIF is included in a PDCCH may be configured semi-statically, and may be enabled UE-specifically by higher layer signaling.

When the CIF is disabled, a PDCCH on a specific DL CC may allocate a PDSCH resource on the same DL CC and allocate a PUSCH resource on a UL CC linked with the specific DL CC. In this case, the same coding scheme, CCE based resource mapping and DCI formats as those used for the conventional PDCCH structure are applicable.

Meanwhile, when the CIF is enabled, a PDCCH on a specific DL CC may allocate a PDSCH/PUSCH resource on a DL/UL CC indicated by the CIF from among aggregated CCs. In this case, the CIF can additionally be defined in the existing PDCCH DCI formats. The CIF may be defined as a field having a fixed length of 3 bits, or a CIF position may be fixed irrespective of DCI format size. Even in this case, the same coding scheme, CCE based resource mapping and DCI formats as those used for the conventional PDCCH structure are applicable.

Even when the CIF is present, an eNB may allocate a DL CC set through which a PDCCH is monitored. Accordingly, blinding decoding overhead of a UE may be reduced. A PDCCH monitoring CC set is a part of aggregated DL CCs and a UE may perform PDCCH detection/decoding in the CC set only. That is, the eNB may transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 11, DL CC A may be configured as a PDCCH monitoring DL CC. When the CIF is disabled, a PDCCH on each DL CC can schedule only the PDSCH on DL CC A. Meanwhile, when the CIF is enabled, the PDCCH on DL CC A may schedule PDSCHs in other DL CCs as well as the PDSCH in DL CC A. When DL CC A is set as a PDCCH monitoring CC, no PDCCH may be transmitted to DL CC B and DL CC C.

Hereinafter, a method for configuring a resource period in a cell/carrier in which an available resource period is acquired or configured aperiodically or discontinuously in the same manner as an unlicensed band where exclusive usage of a specific system is not assured, and a UE operation accompanied with the method will be described.

Figure 7:
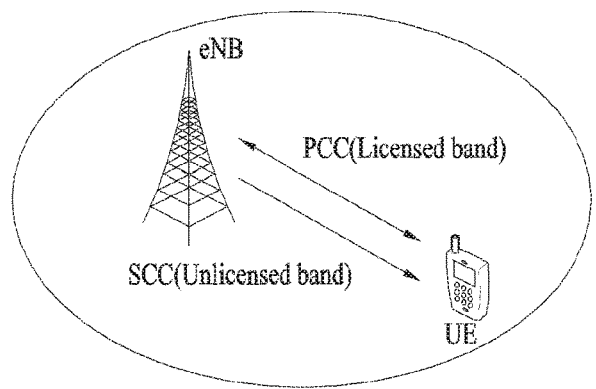
FIG. 7 is a diagram illustrating that a base station transmits a signal to a UE or vice versa under a carrier aggregation status of an LTE-A band which is a licensed band and an unlicensed band.

FIG. 7 is a diagram illustrating that a base station transmits a signal to a UE or vice versa under a carrier aggregation status of an LTE-A band which is a licensed band and an unlicensed band.

In the following description, for convenience of description of the present invention, it is assumed that a UE performs wireless communication in each of a licensed band and an unlicensed band through two component carriers as shown in FIG. 7. In this case, a carrier of the licensed band may be referred to as a primary component carrier (PCC or PCell) while a carrier of the unlicensed band may be referred to as a secondary component carrier (SCC or SCell).

However, the embodiments of the present invention may be applied to even the status that a plurality of licensed bands and a plurality of unlicensed bands are used by a carrier aggregation scheme. Also, the embodiments of the present invention may be applied to even the case that signal transmission and reception between an eNB and a UE is performed in an unlicensed band only. Also, the embodiments of the present invention may be applied to the other systems as well as the 3GPP LTE system.

In order that the eNB and the UE perform communication in the LTE-U band, since the corresponding band corresponds to an unlicensed spectrum, the corresponding band should be reserved/acquired for a specific time duration through contention with other communication (e.g., WiFi) system irrespective of the LTE (hereinafter, the time duration reserved/acquired for communication in the LTE-U band will be referred to as a reserved resource period (RRP)). Various methods may exist to acquire the RRP.

Typically, a method for transmitting a specific reservation signal to allow other communication system devices such as WiFi to recognize that a corresponding radio channel is reserved (busy) or continuously transmitting a reference signal (RS) and a data signal to transmit a signal of a specific power level or more without disconnection for a reserved resource period (RRP) is available.

In this way, if the eNB previously determines the RRP for reserving the LTE-U band, the eNB previously notifies the UE of the determined RRP to allow the UE to maintain a communication transmission/reception link for the corresponding indicated RRP.

As a method for notifying the UE of corresponding RRP information, the eNB may indicate corresponding RRP information through another CC (e.g., LTE-A band) linked in the form of carrier aggregation.

As another example of an unlicensed band operation operating in a contention based random access mode, the eNB may perform carrier sensing (CS) before performing data transmission and reception. The eNB checks whether a current channel state of the SCell is busy or idle. If it is determined that the current channel state is idle, the eNB may transmit control information (e.g., scheduling grant)

through (E)PDCCH of the PCell (i.e., cross carrier scheduling, CCS) or through PDCCH of the SCell and attempt data transmission and reception.

At this time, the eNB may configure an RRP comprised of M consecutive subframes (SFs) (in this case, M is a natural number). In this case, a value of M and usage of the M subframes may previously be notified from the eNB to the UE through higher layer signaling (using PCell) or through a physical control/data channel. A start point of the RRP may be configured periodically (or semi-statically) by higher layer signaling. Alternatively, when the RRP start point is desired to be set to SF#n, the start point of the RRP may be designated through physical layer signaling at SF#n or SF#(n−k).

Aperiodic PUSCH Feedback

CSI (channel state information) feedback scheme in the LTE standard is categorized into periodic reporting through a PUCCH which is an uplink control channel and aperiodic reporting through a PUSCH which is an uplink data channel transmitted by a request of an eNB. The aperiodic reporting is configured for each UE by a request bit included in uplink scheduling information transmitted from the eNB to the UE, and if this information is received by each UE, each UE delivers channel information considering a transmission mode of each UE to the eNB through the PUSCH. In case of the periodic reporting, a period through which channel information is transmitted through a higher layer signal and offset at the corresponding period are signaled to each UE in a unit of subframe, and channel information considering a transmission mode of each UE is delivered to the eNB through the PUCCH in accordance with a given period. If data transmitted to the uplink exist simultaneously at a subframe for transmitting channel information in accordance with a given period, the corresponding channel information is transmitted through the uplink data channel (PUSCH) together with data not the uplink control channel (PUCCH).

Aperiodic PUSCH feedback of the channel information will be described in more detail. The aperiodic PUSCH feedback is categorized into six reporting modes in accordance with CQI and PMI feedback types as listed in Table 3. Each reporting mode will be described as follows.

TABLE 3

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4 bit)<br>2nd wideband CQI(4 bit)<br>if RI > 1<br>N*Subband PMI(4 bit)<br>(N is the total # of subbands)<br>(if 8Tx Ant,<br>N*subband W2 +<br>wideband W1) |
| | UE selected (Subband CQI) | Mode 2-0<br>RI (only for Open-loop SM)<br>1st wideband CQI(4 bit) + Best-M CQI(2 bit)<br>(Best-M CQI: CQI of M SBs selected from a total of N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| | Higher Layer-configured (Subband CQI) | Mode 3-0<br>RI (only for Open-loop SM)<br>1st wideband CQI(4 bit) + N*subband CQI(2 bit) | Mode 3-1<br>RI<br>1st wideband CQI(4 bit) + N*subbandCQI(2 bit)<br>2nd wideband CQI(4 bit) + N*subbandCQI(2 bit) if RI > 1<br>Wideband PMI(4 bit)<br>(if 8Tx Ant, wideband W2 + wideband W1) | Mode 3-2<br>RI<br>1st wideband CQI(4 bit) + N*subbandCQI(2 bit)<br>2nd wideband CQI(4 bit) + N*subbandCQI(2 bit) if RI > 1<br>N*Subband PMI(4 bit)<br>(N is the total # of subbands)<br>(if 8Tx Ant,<br>N*subband W2 +<br>wideband W1) |

Aperiodic CSI Request

In the current LTE standard, if a carrier aggregation (CA) environment is considered, a 2-bit CSI request field of a DCI format 0 or 4 is used to operate aperiodic CSI report. The UE construes the CSI request field as 2-bit if several serving cells exist in a CA environment. If one of transmission modes 1 to 9 is configured for all component carriers (CCs), aperiodic CSI report is triggered in accordance with the following Table 4, and if a transmission mode 10 is configured for at least one of the plurality of CCs, aperiodic CSI report is triggered in accordance with the following Table 5.

TABLE 4

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cell s configured by higher layers |
| '11' | Aperiodic CSI report is triggered for a $2^{nd}$ set of serving cell s configured by higher layers |

TABLE 5

| Value of CSI request field | Description |
|---|---|
| '00' | No aperiodic CSI report is triggered |
| '01' | Aperiodic CSI report is triggered for a set of CSI process(es) configured by higher layers for serving cell c |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

The present invention suggests a method for triggering aperiodic CSI report in CA of different duplex modes or one duplex mode, an operation of a UE, which has received the aperiodic CSI report triggering, for construing the aperiodic CSI report triggering, and a method for enabling the UE to transmit CSI report based on the aperiodic CSI report triggering through an uplink channel. Also, the present invention suggests a method for reporting periodic CSI report.

Aperiodic CSI Triggering and Report

In a massive CA environment where 5 or more CCs are aggregated to transmit downlink data, for example, CA environment where 16 CCs are aggregated, if a UE for which a transmission mode 10 is configured to support CoMP (Coordinated Multi-Point) is considered, the number of CSI processes that may be configured for aperiodic CSI through a higher layer signal (e.g., RRC signal) is increased to 64. By contrast, since the number of CSI processes that may be included in one triggering set configured for aperiodic CSI through a higher layer signal (e.g., RRC signal) is maximum 5, the number of maximum CSI processes in which bit fields "01", "10" and "11" in Table 5 may be included is limited to 14.

Therefore, if an eNB uses aperiodic CSI triggering according to the current LTE standard, the eNB may perform aperiodic CSI triggering for only a limited number of CCs, and has a restriction that the eNB should newly configure a triggering set through a higher layer signal even when desiring to acquire flexibility for the triggered CCs. Therefore, the present invention suggests a method for managing aperiodic CSI triggering and/or report for more various CCs or CSI processes in such a massive CA environment. The triggering set for aperiodic CSI report, which will be mentioned later, may be configured through a higher layer signal (e.g., RRC signal), or may be indicated by a dynamic signal.

For aperiodic CSI triggering for more CCs or CSI processes, the followings will be suggested. If the number of CCs configured for the UE is a certain number is more or the number of CSI processes is a certain number or more, the number of CCs or CSI processes that may be included in each triggering set is increased. However, in this case, as the number of CCs or CSI processes which are triggered is increased, excessive aperiodic CSI report may be caused. In other words, if the eNB desires to be reported a specific CSI process within a specific CC, all aperiodic CSI reports for unnecessary CSI processes are triggered together with aperiodic CSI report for the triggering set in which the corresponding CSI process is included, whereby PUSCH resource may be wasted.

Aperiodic CSI measurement target CCs or CSI processes are configured differently per UL CC scheduled by uplink grant included in downlink control information (DCI). In more detail, aperiodic CSI measurement target CC or CSI process sets configured through higher layer signaling (e.g., RRC signaling) may be configured independently (differently) per UL cell or CC in which aperiodic CSI report transmission is performed. If cross-carrier scheduling is performed, aperiodic CSI measurement target CCs or CSI processes may be configured differently per cell or CC indicated by CIF (carrier indicator field) information.

Otherwise, aperiodic CSI measurement target CCs or CSI processes are configured differently per DL CC to which DCI including uplink grant is transmitted.

Otherwise, aperiodic CSI measurement target CCs or CSI processes may be configured independently (differently) per UL CC group scheduled by uplink grant. In more detail, aperiodic CSI measurement target CC or CSI process sets configured through higher layer signaling (e.g., RRC signaling) may be configured independently (differently) per UL cell group or CC group in which aperiodic CSI report transmission is performed. In this case, a common aperiodic CSI measurement target CC or CSI process may be configured for all UL cells/CCs belonging to one UL cell group/CC group.

Otherwise, aperiodic CSI measurement target CCs or CSI processes are configured differently per DL cell group to which DCI including uplink grant is transmitted.

For example, in a carrier aggregation environment where 16 DL CCs are aggregated, CCs which will be included in each of triggering sets may be configured differently in the form of Table 6 for a case that a PUSCH including aperiodic CSI is transmitted to (uplink) CC 1 (in other words, the case that aperiodic CSI is requested through uplink grant for scheduling the CC 1) and a case that a PUSCH including aperiodic CSI is transmitted to (uplink) CC 2 (in other words, the case that aperiodic CSI is requested through uplink grant for scheduling the CC 2).

For another example, in a carrier aggregation environment where 8 DL CCs are aggregated, when 4 CSI processes are configured per CC, CCs which will be included in each of triggering sets may be configured differently in the form of Table 7 for a case that a PUSCH including aperiodic CSI is transmitted to CC 1 and a case that the PUSCH is transmitted to CC 2.

TABLE 6

| CSI request bit field | CSI measurement target CC when PUSCH is transmitted to CC1 | CSI measurement target CC when PUSCH is transmitted to CC2 |
|---|---|---|
| 00 | No aperiodic CSI report is triggered | No aperiodic CSI report is triggered |
| 01 | CC 1 | CC 2 |
| 10 | CC 3, 4, 5, 6, 7 | CC 8, 9, 10, 11, 12 |
| 11 | CC 13, 14, 1, 3, 5 | CC 15, 16, 2, 4, 6 |

TABLE 7

| CSI request bit field | CSI measurement target CSI process when PUSCH is fed back to CC1 | CSI measurement target CSI process when PUSCH is fed back to CC2 |
|---|---|---|
| 00 | No aperiodic CSI report is triggered | No aperiodic CSI report is triggered |
| 01 | (CC 1, CSIproc1), (CC 1, CSIproc2), (CC 1, CSIproc3), (CC 1, CSIproc4) | (CC 2, CSIproc1), (CC 2, CSIproc2), (CC 2, CSIproc3), (CC 2, CSIproc4) |
| 10 | (CC 3, CSIproc1), (CC 4, CSIproc1), (CC 5, CSIproc1), (CC 6, CSIproc1), (CC 7, CSIproc1) | (CC 3, CSIproc2), (CC 4, CSIproc2), (CC 5, CSIproc2), (CC 6, CSIproc2), (CC 7, CSIproc2) |
| 11 | (CC 3, CSIproc3), (CC 4, CSIproc3), (CC 5, CSIproc3), (CC 6, CSIproc3), (CC 8, CSIproc1) | (CC 3, CSIproc4), (CC 4, CSIproc4), (CC 5, CSIproc4), (CC 6, CSIproc4), (CC 8, CSIproc2) |

CCs or CSI processes which will be included in a triggering set for aperiodic CSI report are configured differently in a unit of time duration designated through a higher layer signal (e.g., RRC signal). In more detail, aperiodic CSI measurement target CCs or CSI processes configured through higher layer may be configured independently (differently) depending on a time duration corresponding to (1) a detection timing (e.g., subframe at which uplink grant DCI is detected) of uplink grant DCI including CSI request or (2) a transmission timing (e.g., subframe at which PUSCH including aperiodic CSI is transmitted) of PUSCH including aperiodic CSI.

This is because that aperiodic CSI report request of a certain range or less may be required at a time duration due to a limitation in CSI computation that may be processed by the UE even though the eNB performs CSI request for more CCs or CSI processes.

For example, in a carrier aggregation environment where 16 DL CCs are aggregated, if a PUSCH including aperiodic CSI is transmitted to (uplink) CC 1 (in other words, if aperiodic CSI is requested through uplink grant for scheduling the CC 1), CCs which are CSI measurement targets may be configured differently depending on a time duration to which a detection timing (e.g., subframe on which uplink grant DCI is detected) of uplink grant DCI including CSI request or a transmission timing (e.g., subframe on which PUSCH including aperiodic CSI is transmitted) of PUSCH including aperiodic CSI belongs, that is, a time duration of t1~t2 or a time duration of t2~t3, as listed in Table 8 and Table 9.

For another example, in a carrier aggregation environment where 8 DL CCs are aggregated, when 4 CSI processes are configured per CC, CSI processes which are CSI measurement targets may be configured differently depending on a time duration to which a detection timing of uplink grant DCI including CSI request or a transmission timing of PUSCH including aperiodic CSI belongs, that is, a time duration of t1~t2 or a time duration of t2~t3, as listed in Table 10 and Table 11.

TABLE 8

| CSI request bit field | CSI measurement target CCs when UL grant DCI including CSI request is detected for a time duration of t1~t2 | CSI measurement target CCs when UL grant DCI including CSI request is detected for a time duration of t2~t3 |
|---|---|---|
| 00 | No aperiodic CSI report is triggered | No aperiodic CSI report is triggered |
| 01 | CC 1 | CC 1 |
| 10 | CC 2, 3, 4, 5, 6 | CC 7, 8, 9, 10, 11 |
| 11 | CC 12, 13, 14, 15 | CC 16, 1, 2, 3, 4 |

TABLE 9

| CSI request bit field | CSI measurement target CCs when PUSCH including aperiodic CSI is transmitted for a time duration t1~t2 | CSI measurement target CCs when PUSCH including aperiodic CSI is transmitted for a time duration t2~t3 |
|---|---|---|
| 00 | No aperiodic CSI report is triggered | No aperiodic CSI report is triggered |
| 01 | CC 1 | CC 1 |
| 10 | CC 2, 3, 4, 5, 6 | CC 7, 8, 9, 10, 11 |
| 11 | CC 12, 13, 14, 15 | CC 16, 1, 2, 3, 4 |

TABLE 10

| CSI request bit field | CSI measurement target CSI processes when UL grant DCI including CSI request is detected for a time duration of t1~t2 | CSI measurement target CSI processes when UL grant DCI including CSI request is detected for a time duration of t2~t3 |
|---|---|---|
| 00 | No aperiodic CSI report is triggered | No aperiodic CSI report is triggered |
| 01 | (CC 1, CSIproc1), (CC 1, CSIproc2), (CC 1, CSIproc3), (CC 1, CSIproc4) | (CC 1, CSIproc1), (CC 1, CSIproc2), (CC 1, CSIproc3), (CC 1, CSIproc4) |
| 10 | (CC 2, CSIproc1), (CC 3, CSIproc1), (CC 4, CSIproc1), (CC 5, CSIproc1), (CC 6, CSIproc1) | (CC 7, CSIproc1), (CC 8, CSIproc1), (CC 2, CSIproc2), (CC 3, CSIproc2), (CC 4, CSIproc2) |
| 11 | (CC 5, CSIproc1), (CC 6, CSIproc1), (CC 7, CSIproc2), (CC 8, CSIproc2), (CC 2, CSIproc3) | (CC 3, CSIproc3), (CC 4, CSIproc3), (CC 5, CSIproc3), (CC 6, CSIproc3), (CC 7, CSIproc3) |

TABLE 11

| CSI request bit field | CSI measurement target CSI processes when PUSCH including aperiodic CSI is transmitted for a time duration of t1~t2 | CSI measurement target CCs when PUSCH including aperiodic CSI is transmitted for a time duration of t2~t3 |
|---|---|---|
| 00 | No aperiodic CSI report is triggered | No aperiodic CSI report is triggered |
| 01 | (CC 1, CSIproc1), (CC 1, CSIproc2), (CC 1, CSIproc3), (CC 1, CSIproc4) | (CC 1, CSIproc1), (CC 1, CSIproc2), (CC 1, CSIproc3), (CC 1, CSIproc4) |
| 10 | (CC 2, CSIproc1), (CC 3, CSIproc1), (CC 4, CSIproc1), (CC 5, CSIproc1), (CC 6, CSIproc1) | (CC 7, CSIproc1), (CC 8, CSIproc1), (CC 2, CSIproc2), (CC 3, CSIproc2), (CC 4, CSIproc2) |
| 11 | (CC 5, CSIproc1), (CC 6, CSIproc1), (CC 7, CSIproc2), (CC 8, CSIproc2), (CC 2, CSIproc3) | (CC 3, CSIproc3), (CC 4, CSIproc3), (CC 5, CSIproc3), (CC 6, CSIproc3), (CC 7, CSIproc3) |

Meanwhile, if a bit value of the CSI request field is "01", 1) CCs or CSI processes (for example, CC1 or CSI process configured in the corresponding CC1 in Tables 8 to 11) may be configured equally to the existing case for all time durations as listed in the above Tables, or 2) CCs or CSI processes may be configured equally to the existing case for only some time duration (e.g., t1~t2) and a separate CC or CSI process set may be configured for the other time duration (e.g., t2~t3) through a higher layer signal (e.g., RRC signaling).

Meanwhile, as an example of the suggested method, a plurality of cells and/or CSI processes may be linked per state corresponding to each of bit values that may be owned by the CSI request field, through predefined signaling, and if a specific state (hereinafter, referred to as "STATE X") is repeatedly triggered at different times (or the same time), aperiodic CSI report for some cells and/or CSI processes among a plurality of cells and/or CSI processes linked to the corresponding STATE X may be defined in accordance with the following rules. For example, if K cells and/or CSI processes are linked to the STATE X through RRC signaling, N cells and/or CSI processes actually selected through circular shift selection may be selected in accordance with a priority of aperiodic CSI information mapped into a physical PUSCH resource (e.g., low cell index first mapping). Hereinafter, for convenience of description, it is assumed that information of {CSI PROCESS#0 of CELL#0, CSI PROCESS#1 of CELL#0, CSI PROCESS#0 of CELL#1, CSI PROCESS#1 of CELL#1, CSI PROCESS#0 of CELL#2, CSI PROCESS#1 of CELL#2, CSI PROCESS#0 of CELL#3, CSI PROCESS#1 of CELL#3, CSI PROCESS#0 of CELL#4, CSI PROCESS#1 of CELL#4} is linked to the STATE X through predefined signaling (e.g., higher layer signaling or physical layer signaling).

Example #1

A predefined (or signaled) number of cells and/or CSI processes may sequentially be selected by circular shift selection and then configured to report aperiodic CSI information. In this case, as a detailed example, if the STATE X is triggered at a timing of SF#N, among cells and/or CSI processes linked to the STATE X, aperiodic CSI information of {CSI PROCESS#0 of CELL#0, CSI PROCESS#1 of CELL#0, CSI PROCESS#0 of CELL#1, CSI PROCESS#1 of CELL#1, CSI PROCESS#0 of CELL#2} may be reported, and if the STATE X is repeatedly triggered at a timing of SF#(N+K) (in this case, K is an integer greater than 0), among cells and/or CSI processes linked to the STATE X, aperiodic CSI information of {CSI PROCESS#1 of CELL#2, CSI PROCESS#0 of CELL#3, CSI PROCESS#1 of CELL#3, CSI PROCESS#0 of CELL#4, CSI PROCESS#1 of CELL#4} may be reported. In this case, this operation is an example of a case that the eNB is configured to report aperiodic CSI information related to 5 cells and/or CSI processes to the UE through predefined signaling if the STATE X is triggered at a specific timing.

Example #2

If the STATE X is triggered at a specific timing (i.e., SF#N), among cells and/or CSI processes linked to the STATE X, only predefined (or signaled) cells (or CSI processes related to cells where RRP is actually configured at SF#N) where RRP is actually configured at the corresponding SF#N (or regarded as CSI reference resources where the corresponding SF#N is valid (particularly, useful in case of transmission modes 1 to 9)) may sequentially be selected by circular shift selection, and may be configured to report aperiodic CSI information of the corresponding selected cells (or CSI processes related to the cells). In this case, for example, the terms "cells where RRP is actually configured at SF#N (or CSI processes related to the cells)" may be construed to indicate cells where SF#N timing is set to RRP, among unlicensed band based cells (i.e., UCELL(S)), and/or licensed band based cells (i.e., licensed band based cells may be construed as those where RRP is always set).

Example #3

For example, if information of {'CSI PROCESS#0 of CELL#0, CSI PROCESS#1 of CELL#0, CSI PROCESS#0 of CELL#1, CSI PROCESS#1 of CELL#1' belonging to CELL GROUP#0, 'CSI PROCESS#0 of CELL#2, CSI PROCESS#1 of CELL#2' belonging to CELL GROUP#1, 'CSI PROCESS#0 of CELL#3, CSI PROCESS#1 of CELL#3' belonging to CELL GROUP#2, 'CSI PROCESS#0 of CELL#4, CSI PROCESS#1 of CELL#4' belonging to CELL GROUP#3} is linked to the STATE X through predefined signaling (e.g., higher layer signaling or physical layer signaling), and the STATE X is triggered at a specific timing (i.e., SF#N), predefined (or signaled) cell groups may sequentially be selected by circular shift selection, and may be configured to report aperiodic CSI information for cells (or CSI processes related to the cells) related to the corresponding selected cell groups. In this case, as a detailed example, if the STATE X is triggered at SF#N, aperiodic CSI information of 'CSI PROCESS#0 of CELL#0, CSI PROCESS#1 of CELL#0, CSI PROCESS#0 of CELL#1, CSI PROCESS#1 of CELL#1' belonging to CELL GROUP#0 may be reported, and if the STATE X is repeatedly triggered at SF#(N+K) (in this case, K is an integer greater than 0), aperiodic CSI information of 'CSI PROCESS#0 of CELL#2, CSI PROCESS#1 of CELL#2' belonging to CELL GROUP#1 may be reported. In this case, this operation is an example of a case that the eNB is configured to report aperiodic CSI information related to one cell group to the UE through predefined signaling if the STATE X is triggered at a specific timing.

A method for defining a plurality of trigger configurations comprised of two triggering sets and notifying index information of the trigger configurations from an eNB to a UE when aperiodic CSI report is requested will be described. In more detail, trigger configuration index which will be used for a certain time duration may be signaled through a MAC signal. For example, when 4 CSI processes are configured per CC in a system in which 10 DL CCs are aggregated, one trigger configuration may be defined by grouping two triggering sets as listed in Table 12.

TABLE 12

| trigger configuration index | triggering set index | (CC index, CSI process index) |
|---|---|---|
| 0 | 1 | (1, 1), (2, 1), (3, 1), (4, 1), (5, 1) |
|   | 2 | (1, 2), (2, 2), (3, 2), (4, 2), (5, 2) |
| 1 | 1 | (1, 3), (2, 3), (3, 3), (4, 3), (5, 3) |
|   | 2 | (1, 4), (2, 4), (3, 4), (4, 4), (5, 4) |
| 2 | 1 | (6, 1), (7, 1), (8, 1), (9, 1), (10, 1) |
|   | 2 | (6, 2), (7, 2), (8, 2), (9, 2), (10, 2) |
| 3 | 1 | (6, 3), (7, 3), (8, 3), (9, 3), (10, 3) |

TABLE 12-continued

| trigger configuration index | triggering set index | (CC index, CSI process index) |
|---|---|---|
|   | 2 | (6, 4), (7, 4), (8, 4), (9, 4), (10, 4) |

When the number of all CCs or CSI processes configured for the UE is a certain number or more, the number of triggering sets is increased and bits of the CSI request field are also increased. Alternatively, in the same manner as that bits of the CSI request field become Y1 bits if the number of all CCs or CSI processes configured for the UE is X1~X2 and bits of the CSI request field become Y2 bits if the number of all CCs or CSI processes configured for the UE is X2~X3, bits of the CSI request field may be set differently per duration with respect to the number of all CCs or CSI processes.

For example, it is assumed that the CSI request field is set to 2 bits when 20 CSI processes or less are configured, and the CSI request field is set to 3 bits when 20 CSI processes or more are configured. In this case, when 4 CSI processes are configured per CC in a system in which 10 DL CCs are aggregated, and when 4 CSI processes are configured per CC in a system in which 5 DL CCs are aggregated, CSI measurement target CSI processes may be configured differently as listed in Table 13.

TABLE 13

| Case where 20 CSI processes or more are configured (e.g., 10 CC, 4 CSI process per CC) | | Case where 20 CSI processes or less are configured (e.g., 5 CC, 4 CSI process per CC) | |
|---|---|---|---|
| CSI request bit field | CSI measurement target CSI process | CSI request bit field | CSI measurement target CSI process |
| 000 | No aperiodic CSI report is triggered | 00 | No aperiodic CSI report is triggered |
| 001 | (CC 1, CSIproc1), (CC 1, CSIproc2), (CC 1, CSIproc3), (CC 1, CSIproc4) | 01 | (CC 1, CSIproc1), (CC 1, CSIproc2), (CC 1, CSIproc3), (CC 1, CSIproc4) |
| 010 | (CC 2, CSIproc1), (CC 3, CSIproc1), (CC 4, CSIproc1), (CC 5, CSIproc1), (CC 6, CSIproc1) | 10 | (CC 2, CSIproc1), (CC 3, CSIproc1), (CC 4, CSIproc2), (CC 5, CSIproc2), (CC 2, CSIproc3) |
| 011 | (CC 7, CSIproc1), (CC 8, CSIproc1), (CC 9, CSIproc2), (CC 10, CSIproc2), (CC 2, CSIproc3) | 11 | (CC 3, CSIproc3), (CC 4, CSIproc3), (CC 5, CSIproc3), (CC 2, CSIproc4), (CC 3, CSIproc4) |
| 100 | (CC 3, CSIproc3), (CC 4, CSIproc3), (CC 5, CSIproc3), (CC 6, CSIproc3), (CC 7, CSIproc3) | — | — |
| 101 | (CC 8, CSIproc3), (CC 9, CSIproc3), (CC 10, CSIproc3), (CC 2, CSIproc4), (CC 3, CSIproc4) | — | — |
| 110 | (CC 4, CSIproc4), (CC 5, CSIproc4), (CC 6, CSIproc4), (CC 7, CSIproc4), (CC 8, CSIproc4) | — | — |
| 111 | (CC 9, CSIproc4), (CC 10, CSIproc4), (CC 1, CSIproc1), (CC 1, CSIproc2) | — | — |

Aperiodic CSI measurement target CC or CSI process sets configured through higher layer signaling (e.g. RRC signaling) may be configured independently (differently) depending on (1) the number of resource blocks (RBs) allocated from UL grant, (2) RB range, or (3) start index of RB.

For example, in a system in which 16 DL CCs are aggregated, CCs which are CSI measurement targets may be configured differently as listed in Table 14 for a case that aperiodic CSI is requested through UL grant for scheduling UL CC of X RBs or more and a case that aperiodic CSI is requested through UL grant for scheduling UL CC of X RBs or less.

For another example, in a system in which 8 DL CCs are aggregated, when 4 CSI processes are configured per CC, CSI processes which are CSI measurement targets may be configured differently as listed in Table 15 for a case that aperiodic CSI is requested through UL grant for scheduling UL CC of Y RBs or more and a case that aperiodic CSI is requested through UL grant for scheduling UL CC of Y RBs or less.

TABLE 14

| CSI request bit field | CSI measurement target CCs for a case that aperiodic CSI is requested through UL grant for scheduling UL CC of X RBs or more | CSI measurement target CCs for a case that aperiodic CSI is requested through UL grant for scheduling UL CC of X RBs or less |
| --- | --- | --- |
| 00 | No aperiodic CSI report is triggered | No aperiodic CSI report is triggered |
| 01 | CC 1 | CC 1 |
| 10 | CC 2, 3, 4, 5, 6 | CC 7, 8, 9, 10, 11 |
| 11 | CC 12, 13, 14, 15 | CC 16, 1, 2, 3, 4 |

TABLE 15

| CSI request bit field | CSI measurement target CSI processes for a case that aperiodic CSI is requested through UL grant for scheduling UL CC of Y RBs or more | CSI measurement target CSI processes for a case that aperiodic CSI is requested through UL grant for scheduling UL CC of Y RBs or less |
| --- | --- | --- |
| 00 | No aperiodic CSI report is triggered | No aperiodic CSI report is triggered |
| 01 | (CC 1, CSIproc1), (CC 1, CSIproc2), (CC 1, CSIproc3), (CC 1, CSIproc4) | (CC 1, CSIproc1), (CC 1, CSIproc2), (CC 1, CSIproc3), (CC 1, CSIproc4) |
| 10 | (CC 2, CSIproc1), (CC 3, CSIproc1), (CC 4, CSIproc1), (CC 5, CSIproc1), (CC 6, CSIproc1) | (CC 7, CSIproc1), (CC 8, CSIproc1), (CC 2, CSIproc2), (CC 3, CSIproc2), (CC 4, CSIproc2) |
| 11 | (CC 5, CSIproc1), (CC 6, CSIproc1), (CC 7, CSIproc2), (CC 8, CSIproc2), (CC 2, CSIproc3) | (CC 3, CSIproc3), (CC 4, CSIproc3), (CC 5, CSIproc3), (CC 6, CSIproc3), (CC 7, CSIproc3) |

CSI measurement target CC or CSI process sets configured through higher layer signaling (e.g., RRC signaling) may be configured independently (differently) depending on DM-RS CS (cyclic shift) field within DCI for UL grant.

Combination of CS and OCC (orthogonal cover code) of DM-RS used for PUSCH transmission may be indicated through a 3-bit CS field from DCI for UL grant. As an example of the present invention, aperiodic CSI measurement target CC or CSI process sets may be configured independently for a case that the DM-RS CS field is 000, 001, 010, 011 and a case that the DM-RS CSI field is 100, 101, 110, 111. In more general, when an n-bit DM-RS CS field has 2^n states, aperiodic CSI measurement target CC or CSI process sets may be configured independently for each state.

Aperiodic CSI measurement target CC or CSI process sets configured through higher layer signaling (e.g., RRC signaling) may be configured independently depending on subframe index on which PUSCH is transmitted.

For example, aperiodic CSI measurement target CC or CSI process sets may be configured independently (differently) for (1) a case that a value of (q mod 10) for subframe index q on which PUSCH is transmitted is 0~4 and (2) a case that a value of (q mod 10) for subframe index q on which PUSCH is transmitted is 5~9.

Aperiodic CSI measurement target CC or CSI process sets configured through higher layer signaling (e.g., RRC signaling) may be configured independently (differently) depending on a subframe set to which "subframe for requesting aperiodic CSI transmission" or "subframe for transmitting PUSCH including aperiodic CSI" belongs. In this case, information on the corresponding subframe set may be indicated in the form of bitmap (together with period/offset), for example.

For example, it is assumed that SF(subframe) #0, SF #2, SF #4, SF #6, and SF #8 are included in subframe set 0 and SF #1, SF #3, SF #5, SF #7, and SF #9 are included in subframe set 1, when a bitmap is indicated by "1010101010". In this case, aperiodic CSI measurement target CCs or CSI processes may be configured independently (differently) for (1) a case that DCI including a CSI request field for requesting aperiodic CSI transmission is transmitted on one of subframes included in the subframe set 0 and (2) a case that DCI including a CSI request field for requesting aperiodic CSI transmission is transmitted on one of subframes included in the subframe set 1. For example, when aperiodic CSI is requested through UL grant in a system in which 16 DL CCs are aggregated, CCs which are CSI measurement targets may be configured differently depending on a subframe set to which a subframe on which DCI for UL grant is received belongs, as listed in Table 16.

TABLE 16

| CSI request bit field | CSI measurement target CCs when DCI for UL grant is received on subframe corresponding to subframe set 0 | CSI measurement target CCs when DCI for UL grant is received on subframe corresponding to subframe set 1 |
| --- | --- | --- |
| 00 | No aperiodic CSI report is triggered | No aperiodic CSI report is triggered |

TABLE 16-continued

| CSI request bit field | CSI measurement target CCs when DCI for UL grant is received on subframe corresponding to subframe set 0 | CSI measurement target CCs when DCI for UL grant is received on subframe corresponding to subframe set 1 |
| --- | --- | --- |
| 01 | CC 1 | CC 1 |
| 10 | CC 2, 3, 4, 5, 6 | CC 7, 8, 9, 10, 11 |
| 11 | CC 12, 13, 14, 15 | CC 16, 1, 2, 3, 4 |

In a state that one or more CCs are configured as a CC group on the basis of a specific reference (e.g., transmission mode, CSI report mode, etc.) in a carrier aggregation environment, if a specific CC group is indicated as an aperiodic CSI measurement target through higher layer signaling (e.g., RRC signaling), "aperiodic CSI measurement target CCs or CSI processes" in the above-described suggestions may be replaced with a CC group and then configured as follows.

That is, the aperiodic CSI measurement target CC group configured through higher layer signaling (e.g., RRC signaling) may be configured independently (differently) per cell or CC to which aperiodic CSI report is transmitted.

In some embodiments, the aperiodic CSI measurement target CC group configured through higher layer signaling may be configured independently (differently) per time duration corresponding to (1) a detection timing of DCI for UL grant including a CSI request field or (2) a transmission timing of PUSCH including aperiodic CSI report.

In some embodiments, the aperiodic CSI measurement target CC group configured through higher layer signaling may be configured independently (differently) depending on (1) the number of RBs, (2) RB range, or (3) start index of RB.

In some embodiments, the aperiodic CSI measurement target CC group configured through higher layer signaling may be configured independently (differently) depending on the DM-RS CS field within DCI for UL grant.

In some embodiments, the aperiodic CSI measurement target CC group configured through higher layer signaling may be configured independently (differently) depending on the subframe index on which PUSCH is transmitted.

In some embodiments, the aperiodic CSI measurement target CC group configured through higher layer signaling may be configured independently (differently) depending on the subframe set to which "subframe for requesting aperiodic CSI transmission" or "subframe for transmitting PUSCH including aperiodic CSI" belongs.

Similarly, when one or more CSI processes are configured as a CSI process group on the basis of a specific reference, the "aperiodic CSI measurement target CCs or CSI processes" may be configured by being replaced with a CSI process group.

In this case, the UE which is requested aperiodic CSI report transmits aperiodic CSI report for some or all of CCs (or CSI processes) belonging to the indicated CC group (or CSI process group).

At this time, among CCs (or CSI processes) belonging to the indicated CC group (or CSI process group), a predefined (or signaled) number of cells and/or CSI processes may sequentially be selected by circular shift selection and then configured to report aperiodic CSI information.

Alternatively, among CCs (or CSI processes) belonging to the indicated CC group (or CSI process group) at a specific timing (i.e., SF#N), predefined (or signaled) cells and/or CSI processes where RRP is actually configured at SF#N (or regarded as CSI reference resource where the corresponding SF#N is valid (particularly, useful in case of transmission modes 1 to 9)) may sequentially be selected by circular shift selection and then configured to report aperiodic CSI information.

The aperiodic CSI measurement target CC or CSI process sets configured through higher layer signaling (e.g., RRC signaling) may be configured independently (differently) depending on DL CC for transmitting DCI for UL grant including aperiodic CSI request field. In other words, the aperiodic CSI measurement target CCs or CSI processes may be configured independently (differently) depending on DL CC for scheduling "UL CC for transmitting aperiodic CSI".

Particularly, if a plurality of DL CCs not one DL CC are provided to schedule one specific UL CC, the aperiodic CSI measurement target CCs or CSI processes may be configured independently (differently) depending on DL CC for scheduling "UL CC for transmitting aperiodic CSI" as described above.

When the number of CCs included in a specific cell group configured for the UE or the number of CSI processes of CC included in the specific cell group is a certain number or more, the number of triggering sets for the aperiodic CSI measurement target CCs or CSI processes configured through higher layer signaling (e.g., RRC signaling) is increased. Bits of the CSI request field for requesting aperiodic CSI for the corresponding cell group may also be increased.

As another method, the aperiodic CSI measurement target CCs or CSI processes configured through higher layer signaling may be configured independently (differently) depending on DCI format of PDCCH including an aperiodic CSI request field. For example, the aperiodic CSI measurement target CCs or CSI processes may be configured differently for each of DCI formats 0 and 4, and some CCs or CSI processes may be configured equally for each format.

Aperiodic CSI Report Through PUSCH Having No UL-SCH

According to the current LTE standard, if a condition of Table 17 is satisfied, aperiodic CSI report may be performed through a physical uplink shared channel (PUSCH) (e.g., UCI only PUSCH) having no uplink shared channel (UL-SCH).

TABLE 17

When DCI format 0 is used, I_MCS (MCS field value) = 29 or DCI format 4 is used, 1 transport block (TB) is only enabled, I_MCS = 29 of the TB and the number of transmitting layers is 1,
CSI request bit field is 1 bit, aperiodic CSI report is triggered and N_PRB (the number of physical resource blocks) is 4 or less,
or CSI request bit field is 2 bits, aperiodic CSI report is triggered for one serving cell, and N_PRB is 4 or less,
or CSI request bit field is 2 bits, aperiodic CSI report is triggered for a plurality of serving cells, and N_PRB is 20 or less,
or CSI request bit field is 2 bits, aperiodic CSI report is triggered for one CSI process, and N_PRB is 4 or less,
CSI request bit field is 2 bits, aperiodic CSI report is triggered for a plurality of serving cells, and N_PRB is 20 or less.

If more CCs and CSI processes are able to be configured in accordance with the introduction of massive CA, the condition of Table 17, which requests PUSCH having no UL-SCH, may be changed or other conditions may be added. For example, values such as 30 and 31 other than I_MCS=29 may be included in the condition for requesting PUSCH transmission having no UL-SCH.

Therefore, the present invention suggests that aperiodic CSI measurement target CCs or CSI processes configured through higher layer signaling (e.g., RRC signaling) are configured independently (differently) in accordance with the value of I_MCS within DCI for UL grant for requesting PUSCH transmission having no UL-SCH. For example, in a system in which 8 DL CCs are aggregated by CA, CSI processes which will be included in a triggering set may be configured for a UE, for which 4 CSI processes are configured per CC, differently in the form of Table 18.

TABLE 18

| CSI request bit field | CSI measurement target CSI processes when I_MCS = x (e.g., x = 29) | CSI measurement target CSI processes when I_MCS = y (e.g., y = 30) |
|---|---|---|
| 00 | No aperiodic CSI report is triggered | No aperiodic CSI report is triggered |
| 01 | (CC 1, CSIproc1), (CC 1, CSIproc2), (CC 1, CSIproc3), (CC 1, CSIproc4) | (CC 1, CSIproc1), (CC 1, CSIproc2), (CC 1, CSIproc3), (CC 1, CSIproc4) |
| 10 | (CC 2, CSIproc1), (CC 3, CSIproc1), (CC 4, CSIproc1), (CC 5, CSIproc1), (CC 6, CSIproc1) | (CC 7, CSIproc1), (CC 8, CSIproc1), (CC 2, CSIproc2), (CC 3, CSIproc2), (CC 4, CSIproc2) |
| 11 | (CC 5, CSIproc1), (CC 6, CSIproc1), (CC 7, CSIproc2), (CC 8, CSIproc2), (CC 2, CSIproc3) | (CC 3, CSIproc3), (CC 4, CSIproc3), (CC 5, CSIproc3), (CC 6, CSIproc3), (CC 7, CSIproc3) |

Aperiodic CSI Triggering Based on CCE Resource/CCE Mapping Search Space

According to the current LTE standard (TS36.213), when DCI for UL grant is mapped into a common search space (CSS), aperiodic CSI is triggered for CSI processes of a serving cell, which correspond to a bit field "01" of Table 5 if the CSI request field is 1 bit and is set to "1".

In a massive CA environment in which more CCs are aggregated, it is preferable that bits of the CSI request field are not increased and the number of more CCs or CSI processes is triggered if possible. It may not be preferable that the CSI processes associated with the bit value "01" of the CSI request field of Table 5 are always limited to the CSI process of the serving cell. In other words, it is required to configure a triggering set to equally distribute the CSI processes to all CCs without the limitation of CSI processes associated with the bit value "01" of the CSI request field of Table 5.

The present invention suggests that aperiodic CSI measurement target CCs or CSI processes are configured independently (differently) depending on a search space into which CCE (control channel element) of DCI for UL grant is mapped, or CCE resource to/from which DCI for UL grant is transmitted/detected. For example, aperiodic CSI measurement target CCs or CSI processes may be configured differently for each of a case that DCI for UL grant is mapped into a UE-specific search space (USS) and a case that DCI for UL grant is mapped into a common search space (CSS).

In accordance with CCE mapping of DCI for UL grant, it is suggested to use some CSI processes of aperiodic CSI measurement target CC or CSI process sets in a specific case. For example, DCI for UL grant is mapped into the CSS and is set to a bit value (e.g., "1") of a specific CSI request field, some of associated CSI processes trigger aperiodic CSI.

For example, carrier aggregation may occur in a state that CCs of a licensed band and CCs of an unlicensed band coexist. Since DL subframe, reference signals for measurement, etc. may not be always assured in the unlicensed band, if the eNB maps DCI for UL grant into the CSS, the eNB may attempt to trigger the CSI process which belongs to the licensed band rather than the unlicensed band.

For example, in a system in which 8 DL CCs are aggregated by CA, when CCs 1, 3, 5 and 7 correspond to the licensed band and CCs 2, 4, 6 and 8 correspond to the unlicensed band, and 4 CSI processes are configured per CC, it is assumed that CSI processes which will be included in the triggering set are configured in the form of Table 19. When DCI for UL grant is mapped into the CSS, aperiodic CSI is triggered for CSI processes which belong to the licensed band, among the CSI processes associated with the bit value "01" of the CSI request field of Table 19 if the CSI request field is 1 bit and is set to a bit value of "1". That is, aperiodic CSI is triggered for only (CC 1, CSIproc1), (CC 3, CSIproc1), (CC 5, CSIproc1).

TABLE 19

| CSI request bit field | CSI measurement target CSI processes |
|---|---|
| 00 | No aperiodic CSI report is triggered |
| 01 | (CC 1, CSIproc1), (CC 2, CSIproc1), (CC 3, CSIproc1), (CC 4, CSIproc1), (CC 5, CSIproc1) |
| 10 | (CC 6, CSIproc1), (CC 7, CSIproc1), (CC 8, CSIproc1), (CC 1, CSIproc2), (CC 2, CSIproc2) |
| 11 | (CC 3, CSIproc2), (CC 4, CSIproc2), (CC 5, CSIproc2), (CC 6, CSIproc2), (CC 7, CSIproc2) |

The suggested methods and their examples may be applied when the number of DL CCs configured for the UE exceeds a specific reference value. Alternatively, the suggested methods and their examples may also be applied when the number of CSI processes configured for the UE exceeds a specific reference value.

Aperiodic CSI Transmission in Multi-CC Scheduling

Multi-CC scheduling for grouping a plurality of CCs in a CC group on the basis of a specific reference (e.g., transmission mode, CSI report mode, etc.) in a CA environment and scheduling the plurality of CCs included in the corresponding CC group at one time through one kind of control information may be considered. In this case, aperiodic CSI transmission will be suggested as follows.

Aperiodic CSI is transmitted to a specific one of the plurality of CCs included in the CC group scheduled at one time through multi-CC scheduling. At this time, the CC to which aperiodic CSI is transmitted may be designated through a higher layer signal (e.g., RRC signal), or may be indicated by DCI for UL grant.

Aperiodic CSI is transmitted to a UL CC corresponding to a DL CC to which DCI for UL grant is transmitted, among the plurality of CCs included in the CC group scheduled at one time through multi-CC scheduling. If no UL CC corresponding to the DL CC exists, the aperiodic CSI may be dropped.

Periodic CSI Report

In a state that a CC group is configured by one or more CCs on the basis of a specific reference (e.g., transmission mode, CSI report mode, etc.) in a CA environment, transmissions of periodic CSI reports for the plurality of CCs are overlapped, the operation may be performed as follows.

In case of periodic CSI, CSI reports for a plurality of CCs or CC groups may be overlapped at one subframe. A handling method of this collision will be suggested as follows.

CC group index is added to a priority, and single one of a plurality of CSIs for report target CCs is determined to be reported based on the priority (e.g., CSI report type>CSI process>CC group index>CC index>CSI subframe set of all CCs).

single CSIs per CC group are determined based on the following priority and at the same time reported (e.g., CSI report type>CSI process>CC index>CSI subframe set per CC group).

Meanwhile, in a state that a CC group is configured by one or more CCs on the basis of a specific reference (e.g., transmission mode, CSI report mode, etc.) in a CA environment, if the amount (or size) of information related to a plurality of periodic CSI reports to be transmitted at a specific timing is greater than the amount (or size) (N_bth) of simultaneous transmission maximum allowable information previously defined (or signaled), a rule is defined to perform maximum N periodic CSI reports only having a relatively high priority while satisfying a condition of "the amount (or size) of information related to N periodic CSI reports≤N_bth". In this case, the priority may be defined together with the following options.

(Option 1) CC group index>PUCCH report type>CSI process index>CC index>CSI subframe set index (Option 2) PUCCH report type>CC group index>CSI process index>CC index>CSI subframe set index (Option 3) PUCCH report type>CSI process index>CC group index>CC index>CSI subframe set index

[Triggering Subset Configuration]

If different triggering sets including aperiodic CSI measurement target CCs or CSI processes are configured in accordance with the suggested methods, based on a specific triggering set (for example, the corresponding triggering set is used as a superset), the other triggering sets may be configured as subsets of the specific triggering set.

As an example, the specific triggering set may be configured by combination of cells belonging to the licensed band and cells aperiodically/occasionally belonging to the unlicensed band, and the triggering sets configured as subsets of the specific triggering set may be configured by excluding the cells on the unlicensed band from the specific triggering set or excluding some of the cells on the unlicensed band and the cells on the licensed band.

[Best-M CQI Report]

If aperiodic CSI report for N CCs/CSI processes is indicated through higher layer signaling (e.g., RRC signaling) in a CA environment, the UE selects M (<N) CCs/CSI processes as CSI measurement targets in accordance with a priority preferred by the UE (for example, based on RI and/or CQI value) among the indicated N CCs/CSI processes and transmits aperiodic CSI report. For example, the UE may select M (<N) CCs/CSI processes as CSI measurement targets in the order of (1) higher CQI value or (2) lower CC index/CSI process index and transmit aperiodic CSI report. The UE may transmit the aperiodic CSI report together with indexes of the M CCs/CSI processes selected as CSI measurement/report targets.

Similarly, if aperiodic CSI report for N CCs/CSI processes is indicated through higher layer signaling (e.g., RRC signaling), the UE selects M CCs/CSI processes of all CCs/CSI processes and transmits the aperiodic CSI report.

Meanwhile, M may be a random natural number that satisfies the following condition, and may be configured for the UE through a higher layer signal, or may previously be defined or signaled.

(Condition 1) 1≤M≤(the number of all CCs/CSI processes constituting CC group)

(Condition 2) 1≤M≤(the number of all CCs/CSI processes)

(Condition 3) 1≤M≤min(the number of all CCs/CSI processes constituting CC group, the number of CCs/CSI processes corresponding to maximum simultaneous aperiodic CSI computation/report capability of UE)

[Measurement Target CCs/CSI Processes of Aperiodic CSI Triggering]

In the suggested methods of the present invention, CSI measurement target CCs/CSI processes may be selected from all DL CCs and then configured as a set of one state, or may be selected from DL CCs within a previously defined cell group and then configured as a set of one state.

Figure 8:
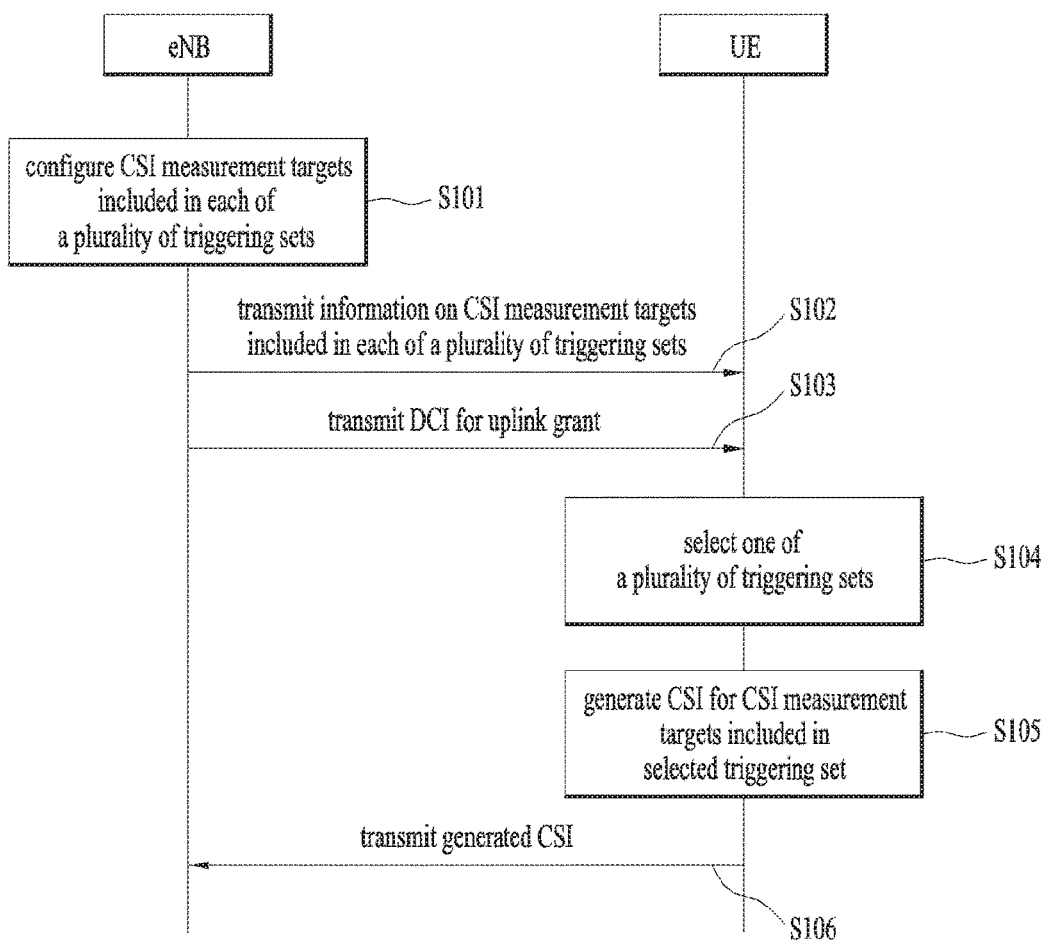
FIG. 8 is a diagram illustrating an operation of a UE and a base station, which is related to a method for aperiodic CSI triggering and report according to the present invention.

FIG. 8 is a diagram illustrating an operation of a UE and an eNB, which is related to a method for aperiodic CSI triggering and reporting according to the present invention. FIG. 8 is an exemplary diagram illustrating a method for aperiodic CSI triggering and report, and technical spirits of the present invention are not limited to the example of FIG. 8.

Referring to FIG. 8, the eNB may configure CSI measurement targets included in each of a plurality of triggering sets (S101).

In some embodiments, the CSI measurement targets included in each of the plurality of triggering sets may include at least one CC as listed in Table 6. In the other embodiments, the CSI measurement targets included in each of the plurality of triggering sets may include at least one CSI process as listed in Table 7.

Meanwhile, at least two of the plurality of triggering sets may correspond to each of a plurality of bit values that may be owned by a CSI request field included in DCI for UL grant. In a detailed example referring to Table 6, a first triggering set including CSI measurement target CC1 and a second triggering set including CSI measurement target CC2 may correspond to a bit value "01" of the CSI request field, a third triggering set including CSI measurement targets CC3, 4, 5, 6, 7 and a fourth triggering set including CSI measurement targets CC8, 9, 10, 11, 12 may correspond to a bit value "10" of the CSI request field, and a fifth triggering set including CSI measurement targets CC13, 14, 1, 3, 5 and a sixth triggering set including CSI measurement targets CC15, 16, 2, 4, 6 may correspond to a bit value "11" of the CSI request field.

The eNB may transmit information on CSI measurement targets included in each of the plurality of triggering sets to the UE (S102), and may transmit DCI for UL grant to the UE (S103). The DCI for UL grant may include a CSI request field. In this case, the CSI request field is a field for requesting the UE of aperiodic CSI report, and may be 1 bit or 2 bits. The DCI may be transmitted through a common search space (CSS), or may be transmitted through a UE-specific search space (USS). The DCI including the CSI request field may be DCI for UL grant or DL grant. For example, if the DCI including the CSI request field is for UL grant, the DCI format may be DCI format 0 or DCI format 4.

The UE that has received the DCI for UL grant may select one triggering set including CSI measurement targets, which will generate the CSI, among at least two triggering sets corresponding to a specific bit value owned by the CSI request field (S104).

The one triggering set may be selected in accordance with a specific reference. For example, the one triggering set may be selected considering any one of UL CC scheduled by the DCI, DL CC to which the DCI is transmitted, a downlink subframe on which the DCI is transmitted, and an uplink subframe on which the CSI is transmitted. Otherwise, the one triggering set may be selected considering any one of the number of resource blocks allocated by the DCI, a range of the resource blocks, and start index of the resource blocks. Otherwise, the one triggering set may be selected considering a cyclic shift field value included in the DCI. Otherwise, the one triggering set may be selected considering a format of the DCI.

As a detailed example referring to Table 6, if a specific field value of the CSI request field is "01", the UE may select any one of the first triggering set including CSI measurement target CC1 and the second triggering set including CSI measurement target CC2, which correspond to the bit value "01". Whether the UE selects the first triggering set or the second triggering set may be varied depending on UL CC scheduled by DCI including the CSI request field, that is, CC which will transmit PUSCH including aperiodic CSI. For example, according to Table 6, if PUSCH including aperiodic CSI is transmitted to CC1, the first triggering set including CSI measurement target CC1 may be selected, and if the PUSCH is transmitted to CC2, the second triggering set including CSI measurement target CC2 may be selected.

The UE may generate CSI for CSI measurement targets included in the selected triggering set (S105), and may transmit the generated CSI to the eNB (S106). If there is UL CC scheduled in accordance with UL grant, the CSI may be transmitted through PUSCH Of the corresponding UL CC.

Figure 9:
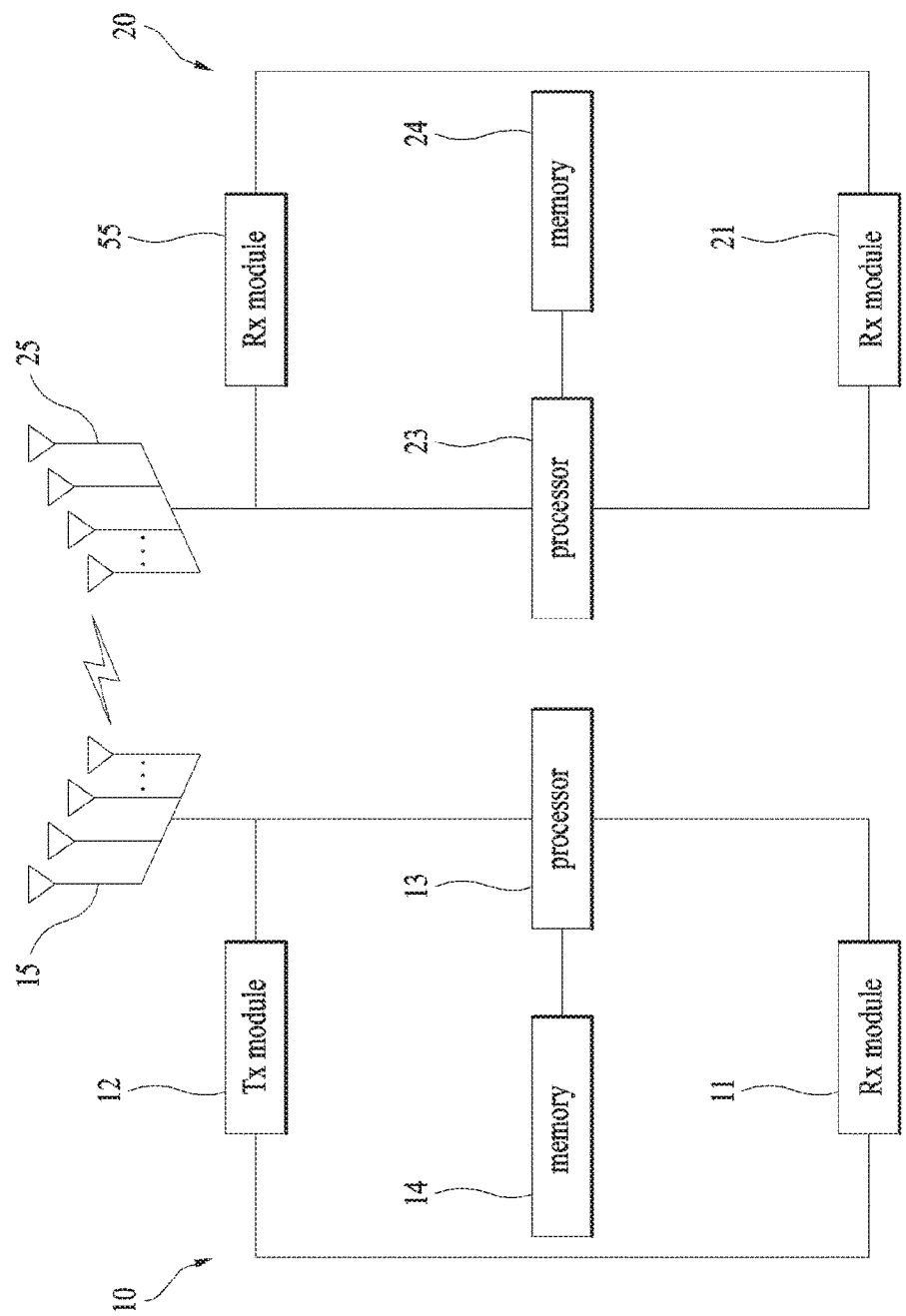
FIG. 9 is a diagram illustrating a preferred embodiment of a UE and a base station according to the present invention.

FIG. 9 is a diagram illustrating a preferred embodiment of a UE and an eNB according to the present invention.

Referring to FIG. 9, an eNB 10 according to the present invention may include an Rx module 11, a Tx module 12, a processor 13, a memory 14, and a plurality of antennas 15. The Rx module 11 may receive various signals, data, and information from an external device (e.g., UE). The Tx module 12 may transmit various signals, data, and information to the external device (e.g., UE). The processor 13 may control an overall operation of the eNB 10. The existence of the plurality of antennas 15 mean that the eNB 10 supports MIMO transmission and reception.

The eNB 10 according to an embodiment of the present invention may be configured to request and receive aperiodic channel status information report in a carrier aggregation system. The processor 13 may configure CSI measurement targets included in each of a plurality of triggering sets, transmit information on the CSI measurement targets included in each of the plurality of triggering sets to the UE 20, transmit DCI for UL grant including a CSI request field to the UE 20, and control the Tx module 12 to receive CSI generated by the UE 20. In addition, the processor 13 of the eNB 10 processes information received by the eNB 10, information to be transmitted to the outside, etc. The memory 14 may store the processed information for a predetermined time and may be replaced by an element such as a buffer (not shown).

The UE 20 according to an embodiment of the present invention may include an Rx module 21, a Tx module 22, a processor 23, a memory 24, and a plurality of antennas 25. The Rx module 21 may receive various signals, data, and information from an external device (e.g., eNB). The Tx module 22 may transmit various signals, data, and information to the external device (e.g., eNB). The processor 2523 may control an overall operation of the UE 20. The existence of the plurality of antennas 25 means that the UE 20 supports MIMO transmission and reception.

The UE 20 according to an embodiment of the present invention may be configured to report aperiodic channel status information in a carrier aggregation system. The processor 23 may receive DCI for UL grant including a CSI request field, select one of a plurality of triggering sets corresponding to a specific bit value owned by the CSI request field, and control the Tx module 22 to transmit CSI for at least one CC or CSI process included in the selected triggering set to the eNB. The processor 23 of the UE 20 processes information received by the UE 20, information to be transmitted to the outside, etc. The memory 24 may store the processed information for a predetermined time and may be replaced by an element such as a buffer (not shown).

The detailed configurations of the eNB 10 and the UE 20 as described above may be implemented such that details of the various embodiments described above are independently applied or two or more embodiments are simultaneously applied. Redundant description is omitted.

Also, in describing the various embodiments of the present invention, the eNB has been exemplarily described as a downlink transmission entity or an uplink reception entity, and the UE has been exemplarily described as a downlink reception entity or an uplink transmission entity. However, the scope of the present invention is not limited thereto. For example, the description of the eNB given above may be equally applied to a case that a cell, an antenna port, an antenna port group, an RRH, a transmission point, a reception point, an access point, and a relay serve as a downlink transmission entity or an uplink reception entity with respect to the UE. In addition, the principle of the present invention described above through various embodiments may be equally applied to a case that a relay serves as a downlink transmission entity or an uplink reception entity with respect to the UE or to a case that the relay serves as an uplink transmission entity or a downlink reception entity with respect to the eNB.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned various embodiments of the present invention may be applied to various mobile communication systems.

The invention claimed is:

1. A method for reporting aperiodic channel status information (CSI) in a carrier aggregation system, the method performed by a user equipment (UE) and comprising:
receiving downlink (DL) control information (DCI) for uplink (UL) grant from a base station, the DCI including information for a CSI request;
selecting one of a plurality of triggering sets; and
transmitting CSI for a measurement target included in the selected one of the plurality of triggering sets to the BS,
wherein a specific bit value of the information for the CSI request is related to the plurality of triggering sets,
wherein the measurement target is at least one component carrier (CC) or at least one CSI process, and
wherein the at least one CC or at least one CSI process is selected by circular shift selection from all CCs or CSI processes included in the selected one of the plurality of triggering sets when a CSI request for the selected one of the plurality of triggering sets is repeated.

2. The method according to claim 1, wherein the one of the plurality of triggering sets is selected based on either an UL CC scheduled by the DCI, a DL CC in which the DCI is transmitted, a DL subframe in which the DCI is transmitted or an UL subframe in which the CSI is transmitted.

3. The method according to claim 1, wherein the one of the plurality of triggering sets is selected based on either a number of resource blocks allocated by the DCI, a range of the resource blocks or a start index of the resource blocks.

4. The method according to claim 1, wherein the one of the plurality of triggering sets is selected based on a cyclic shift field value included in the DCI.

5. The method according to claim 1, wherein the one of the plurality of triggering sets is selected based on a format of the DCI.

6. The method according to claim 1, wherein:
the DCI is for requesting physical uplink shared channel transmission having no UL shared channel; and
the one of the plurality of triggering sets is selected based on a value of a modulation and coding scheme field included in the DCI.

7. The method according to claim 1, wherein the CSI is transmitted via an UL CC designated by a higher layer signal from among a plurality of UL CCs scheduled by multi-CC scheduling.

8. The method according to claim 1, wherein the CSI is transmitted via either an UL CC designated by the DCI or an UL CC corresponding to a DL CC in which the DCI is transmitted from a plurality of UL CCs scheduled by multi-CC scheduling.

9. The method according to claim 1, wherein the one of the plurality of triggering sets is selected based on either a search space to which a CCE (control channel element) of the DCI is mapped or a resource in which the CCE is transmitted.

10. The method according to claim 1, wherein a specific one of the plurality of triggering sets includes a plurality of CCs or a plurality of CSI processes for the plurality of CCs when the specific bit value is "01" and further comprising generating CSI for only some of the plurality of CCs or the plurality of CSI processes when the information for the CSI request is 1 bit set to "1" and the DCI is mapped to a common search space.

11. The method according to claim 10, wherein the CSI is generated for only CCs or CSI processes belonging to a licensed band among the plurality of CCs or the plurality of CSI processes.

12. The method according to claim 1, wherein:
the plurality of triggering sets include a first triggering set and a second triggering set; and
the second triggering set includes only some of a plurality of CCs or CSI processes included in the first triggering set.

13. The method according to claim 12, wherein:
the first triggering set includes at least one licensed band CC and at least one unlicensed band CC; and
the second triggering set includes only the at least one licensed band CC.

14. A user equipment (UE) for reporting aperiodic channel status information (CSI) in a carrier aggregation system, the UE comprising:
a radio frequency (RF) unit configured to transmit and receive information; and
a processor configured to:
control the RF unit to receive downlink (DL) control information (DCI) for uplink (UL) grant from a base station, the DCI including information for a CSI request;
select one of a plurality of triggering sets; and
control the RF unit to transmit CSI for a measurement target included in the selected one of the plurality of triggering sets to the BS,
wherein a specific bit value of the information for the CSI request is related to the plurality of triggering sets,
wherein the measurement target is at least one component carrier (CC) or at least one CSI process, and wherein the at least one CC or at least one CSI process is selected by circular shift selection from all CCs or CSI processes included in the selected one of the plurality of triggering sets when a CSI request for the selected one of the plurality of triggering sets is repeated.

15. The UE according to claim 14, wherein the one of the plurality of triggering sets is selected based on either an UL CC scheduled by the DCI, a DL CC in which the DCI is transmitted, a DL subframe in which the DCI is transmitted or an UL subframe in which the CSI is transmitted.

16. The UE according to claim 14, wherein the one of the plurality of triggering sets is selected based on either a number of resource blocks allocated by the DCI, a range of the resource blocks or a start index of the resource blocks.

17. The UE according to claim 14, wherein the one of the plurality of triggering sets is selected based on a cyclic shift field value included in the DCI.

18. The UE according to claim 14, wherein the one of the plurality of triggering sets is selected based on a format of the DCI.

19. The UE according to claim 14, wherein:
the DCI is for requesting physical uplink shared channel (PUSCH) transmission having no UL shared channel; and
the one of the plurality of triggering sets is selected based on a value of a modulation and coding scheme field included in the DCI.

* * * * *